(12) United States Patent
Kosakai et al.

(10) Patent No.: US 8,810,629 B2
(45) Date of Patent: Aug. 19, 2014

(54) IMAGE PROCESSING APPARATUS, IMAGE CAPTURING APPARATUS, IMAGE PROCESSING METHOD, AND PROGRAM

(75) Inventors: Ryota Kosakai, Tokyo (JP); Seijiro Inaba, Kanagawa (JP)

(73) Assignee: Sony Corporation (JP)

( * ) Notice: Subject to any disclaimer, the term of this patent is extended or adjusted under 35 U.S.C. 154(b) by 435 days.

(21) Appl. No.: 12/927,015

(22) Filed: Nov. 4, 2010

(65) Prior Publication Data

US 2011/0157305 A1   Jun. 30, 2011

(30) Foreign Application Priority Data

Dec. 24, 2009   (JP) ................. P2009-291800

(51) Int. Cl.
| | | |
|---|---|---|
| H04N 13/00 | (2006.01) | |
| G06T 11/60 | (2006.01) | |
| H04N 13/02 | (2006.01) | |

(52) U.S. Cl.
CPC .............. *H04N 13/004* (2013.01); *G06T 11/60* (2013.01); *H04N 13/0221* (2013.01)
USPC .......................................................... 348/43

(58) Field of Classification Search
CPC ...................... H04N 13/02; H04N 2013/0088
USPC ..................................................... 348/43, 36
IPC ........................................... H04N 13/02, 13/00
See application file for complete search history.

(56) References Cited

U.S. PATENT DOCUMENTS

| 7,724,286 | B2 | 5/2010 | Shioya et al. | |
|---|---|---|---|---|
| 2001/0038413 | A1* | 11/2001 | Peleg et al. ................. | 348/36 |
| 2007/0122058 | A1* | 5/2007 | Kitaura et al. ............... | 382/284 |

(Continued)

FOREIGN PATENT DOCUMENTS

| JP | 11-164326 A | 6/1999 |
|---|---|---|
| JP | 3928222 B2 | 3/2007 |
| JP | 4293053 B2 | 7/2009 |

OTHER PUBLICATIONS

"Acquiring Omni-Directional Range Information," Ishiguro et al., Faculty of Engineering Science, Osaka University, Toyonaka-shi, Japan, vol. J74-D-II, No. 4, pp. 500-508 (1991).

(Continued)

*Primary Examiner* — Jay Au Patel
*Assistant Examiner* — Yulin Sun
(74) *Attorney, Agent, or Firm* — Lerner, David, Littenberg, Krumholz & Mentlik, LLP

(57) ABSTRACT

An image processing apparatus includes: an image synthesis unit generating a synthesized image by inputting images photographed at different positions and connecting strip areas cut from the images. The image synthesis unit generates a left-eye synthesized image applied to display a 3-dimensional image by connecting and synthesizing left-eye image strips set in the images and generates a right-eye synthesized image applied to display a 3-dimensional image by connecting and synthesizing right-eye image strips set in the images. The image synthesis unit performs a process of setting the left-eye image strip and the right-eye image strip in an allowable range of set positions of the left-eye image strip and the right-eye image strip used to generate the left-eye synthesized image and the right-eye synthesized image, which are at different observing points, applicable to display the 3-dimensional images by acquiring the allowable range from a memory or calculating the allowable range.

10 Claims, 21 Drawing Sheets

(56) References Cited

U.S. PATENT DOCUMENTS

| | | | |
|---|---|---|---|
| 2009/0195774 A1* | 8/2009 | Kawakami | 356/73 |
| 2009/0208062 A1* | 8/2009 | Sorek et al. | 382/107 |
| 2010/0002081 A1* | 1/2010 | Pawlicki et al. | 348/148 |
| 2010/0253763 A1 | 10/2010 | Shioya et al. | |

OTHER PUBLICATIONS

Office Action from Chinese Application No. 2010-10594261.2, dated Jan. 24, 2014.

* cited by examiner

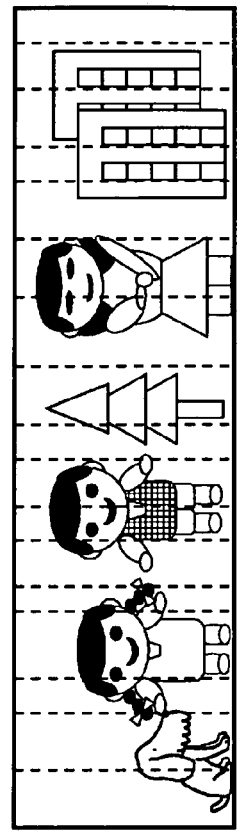
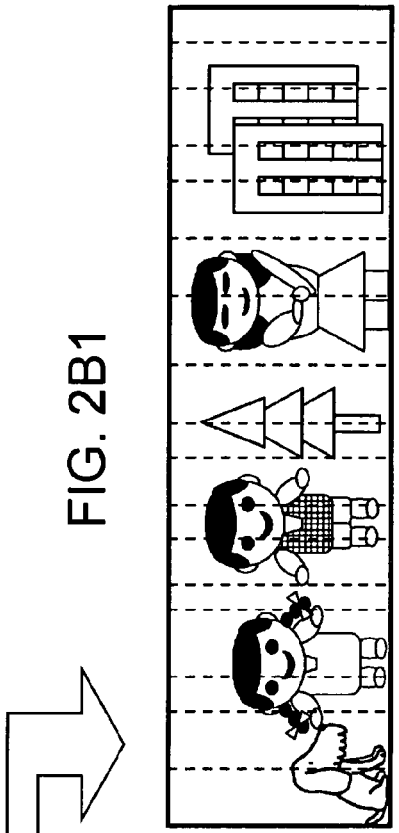
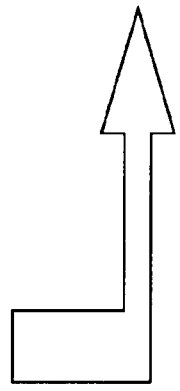
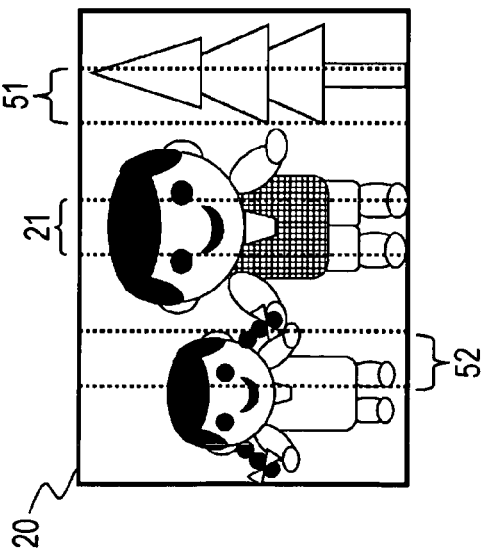
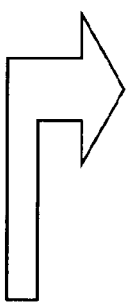

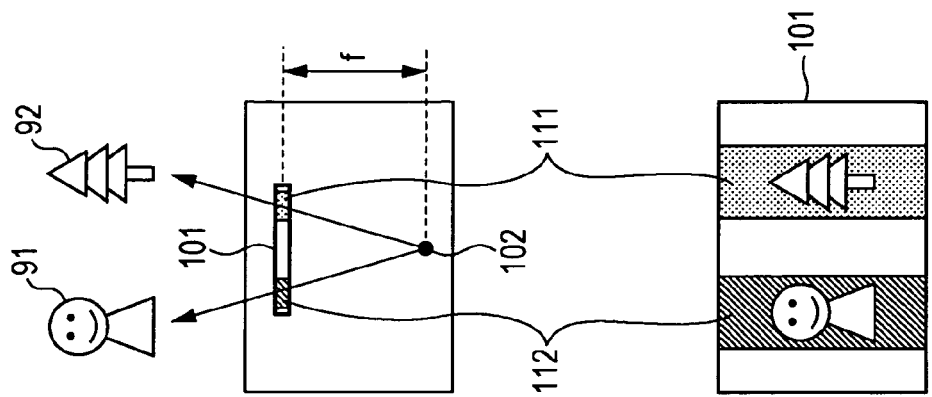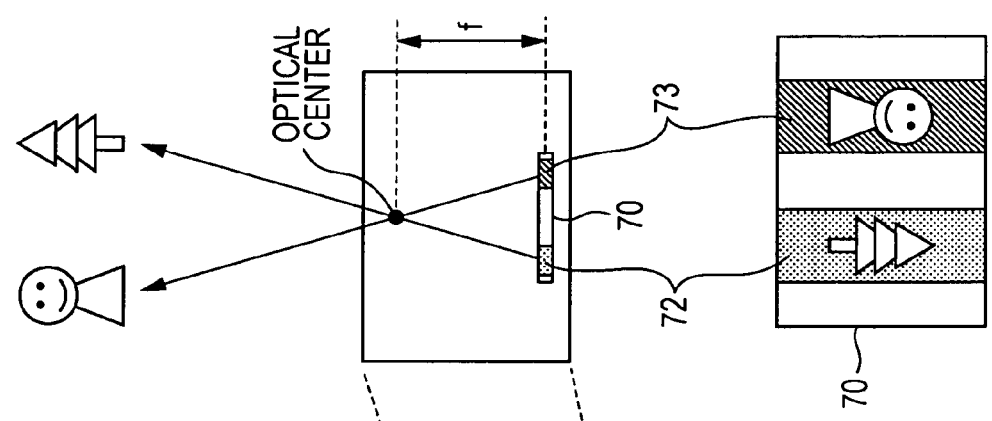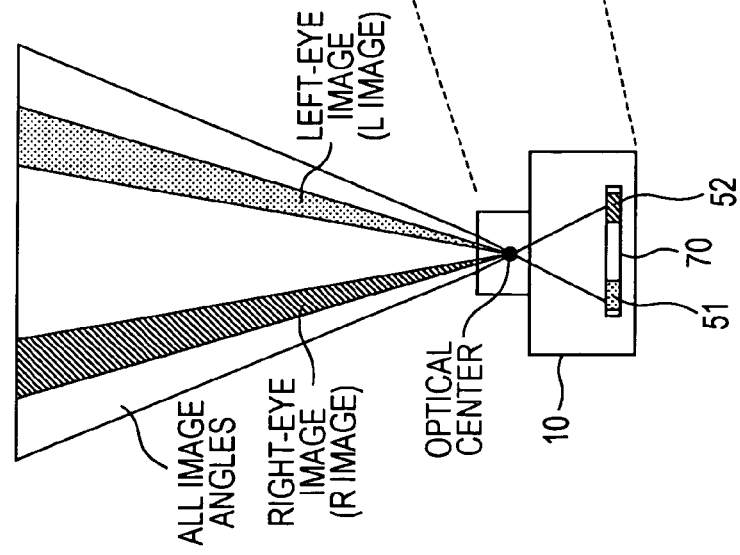

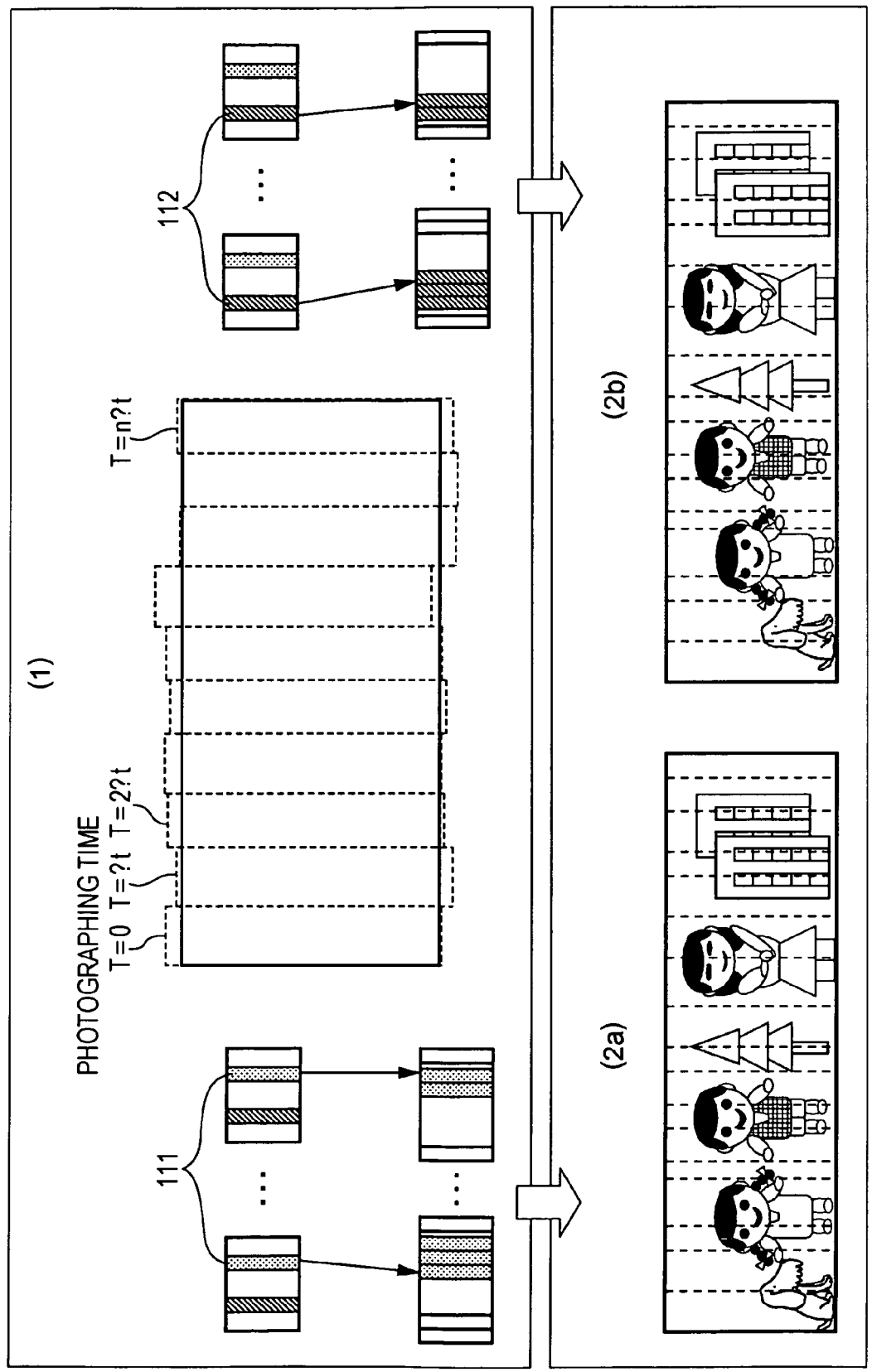

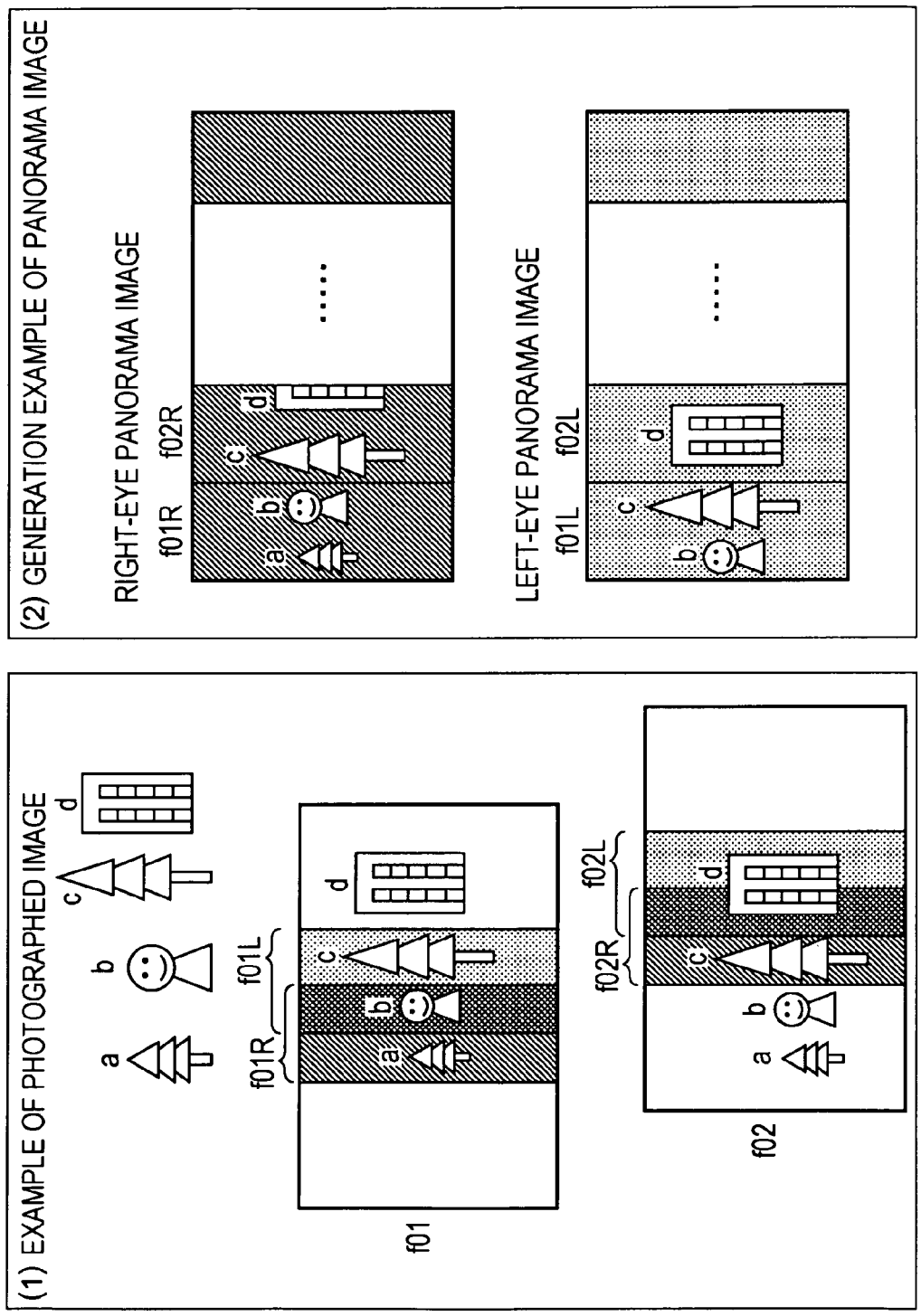

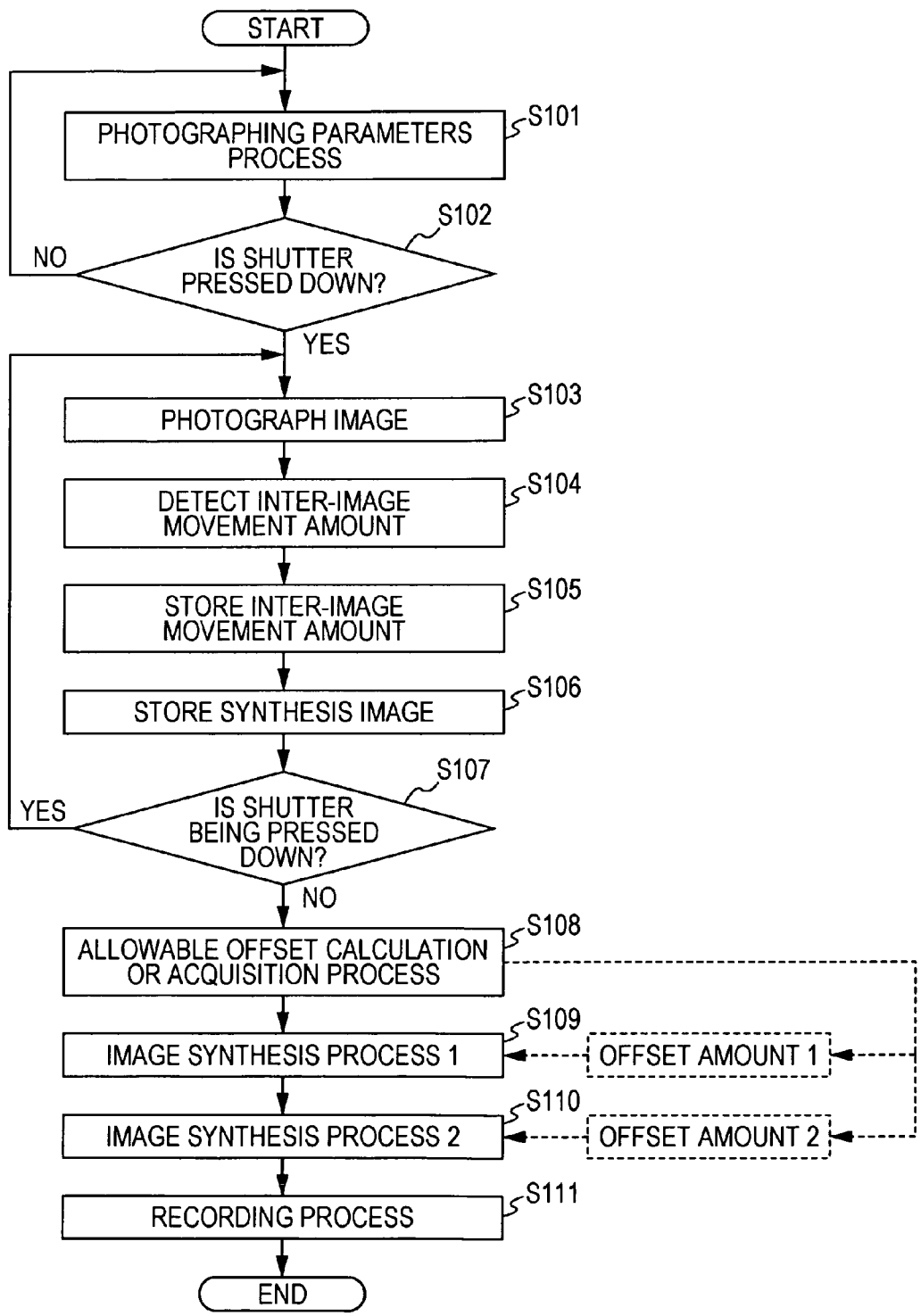

IMAGE PROCESSING APPARATUS, IMAGE CAPTURING APPARATUS, IMAGE PROCESSING METHOD, AND PROGRAM

CROSS-REFERENCE TO RELATED APPLICATION

The present application claims priority from Japanese Patent Application No. JP 2009-291800 filed in the Japanese Patent Office on Dec. 24, 2009, the entire content of which is incorporated herein by reference.

BACKGROUND OF THE INVENTION

1. Field of the Invention

The present invention relates to an image processing apparatus, an image capturing apparatus, an image processing method, and a program, and more specifically, to an image processing apparatus, an image capturing apparatus, an image processing method, and a program capable of generating images to display 3-dimensional images (3D images) using the plurality of images captured while a camera is moved.

2. Description of the Related Art

In order to generate a 3-dimensional image (also called a 3D image or a stereo image), images have to be photographed at different observing points, that is, left-eye images and right-eye images have to be photographed. A method of photographing the images at the different observing points is broadly classified into two.

A first method is a method of using a so-called multi-lens camera capturing a subject simultaneously at different observing points using a plurality of camera units.

A second method is a method of using a so-called single lens camera capturing images continuously at different observing points using a single camera unit while the image capturing apparatus is moved.

For example, a multi-lens camera system used in the first method has a configuration in which lenses are disposed at spaced positions to photograph a subject simultaneously at the different observing points. However, the multi-lens camera system has a problem in that a camera system is expensive since the plurality of camera units is necessary.

On the contrary, a single lens camera system used in the second method includes one camera unit as in a camera according to the related art. A plurality of images is photographed continuously at different observing points while a camera including one camera unit is moved and the plurality of photographed images is used to generate a 3-dimensional image.

Accordingly, when the single lens camera system is used, the system with one camera unit can be realized at a relatively low cost, as in a camera according to the related art.

In "Acquisition of Distance Information Using Omnidirectional Vision" (Journal of the Institute of Electronics, Information and Communication Engineers, D-II, Vol. J74-D-II, No. 4, 1991), a technique according to the related art describes a method of acquiring distance information on a subject from an image photographed while a single lens camera is moved. In "Omni-Directional Stereo" (IEEE Transaction On Pattern Analysis And Machine Intelligence, VOL. 14, No. 2, February 1992), the same contents as those of "Acquisition of Distance Information Using Omnidirectional Vision" (Journal of the Institute of Electronics, Information and Communication Engineers, D-II, Vol. J74-D-II, No. 4, 1991) are also described.

"Acquisition of Distance Information Using Omnidirectional Vision" (Journal of the Institute of Electronics, Information and Communication Engineers, D-II, Vol. J74-D-II, No. 4, 1991) and "Omni-Directional Stereo" (IEEE Transaction On Pattern Analysis And Machine Intelligence, VOL. 14, No. 2, February 1992) describe the method of acquiring the distance information of a subject using two images obtained through two vertical slits by fixing a camera on the circumference placed at a given distance from the rotation center of a rotation table and photographing images continuously while rotating the rotation table.

As in "Acquisition of Distance Information Using Omnidirectional Vision" (Journal of the Institute of Electronics, Information and Communication Engineers, D-II, Vol. J74-D-II, No. 4, 1991) and "Omni-Directional Stereo" (IEEE Transaction On Pattern Analysis And Machine Intelligence, VOL. 14, No. 2, February 1992), Japanese Unexamined Patent Application Publication No. 11-164326 discloses a configuration in which a left-eye panorama image and a right-eye panorama image applied to display a 3-dimensional image are acquired using two images obtained through two slits by installing a camera placed at a given distance from the rotation center of a rotation table and photographing images while the camera is rotated.

In the plurality of techniques according to the related art discloses the method of acquiring the left-eye image and the right-eye image applied to display a 3-dimensional image using the images obtained through the slits when rotating the camera.

On the other hand, there is known a method of generating a panorama image, that is, a 2-dimensional image with a horizontally long shape by photographing images while moving a camera and connecting the plurality of photographed images. For example, Japanese Patent No. 3928222 and Japanese Patent No. 4293053 disclose a method of generating a panorama image.

When the 2-dimensional panorama image is generated, the plurality of images photographed while the camera is moved is used.

"Acquisition of Distance Information Using Omnidirectional Vision" (Journal of the Institute of Electronics, Information and Communication Engineers, D-II, Vol. J74-D-II, No. 4, 1991), "Omni-Directional Stereo" (IEEE Transaction On Pattern Analysis And Machine Intelligence, VOL. 14, No. 2, February 1992), and Japanese Unexamined Patent Application Publication No. 11-164326 describe a principle of acquiring a left-eye image and a right-eye image as 3-dimensional images by applying the plurality of images photographed in a photographing process, like the process of generating the panorama image, and cutting and connecting images at predetermined areas.

However, these documents describe the principle at most. For example, when a user holds a camera with the hands and photographs a panorama image while swinging the camera, a condition or the like of reliably acquiring the left-eye image and the right-eye image applicable to a 3-dimensional image is not described. When the user holds a camera with the hands and photographs a plurality of images while moving the camera, a movement speed or the like of the camera is varied depending on the situation. A necessary condition or like of acquiring the left-eye image and the right-eye image applicable to the 3-dimensional image under various photographing conditions is not clearly described, for example, in the above documents according to the related art.

SUMMARY OF THE INVENTION

It is desirable to provide an image processing apparatus, an image capturing apparatus, an image processing method, and a program capable of reliably controlling generation of a left-eye image and a right-eye image applied to display a 3-dimensional image using a plurality of images photographed while a camera is moved under a photographing condition or in an image capturing apparatus capable of performing various kinds of settings.

According to an embodiment of the invention, there is provided an image processing apparatus including an image synthesis unit generating a synthesized image by inputting a plurality of images photographed at different positions and connecting strip areas cut from the images. The image synthesis unit generates a left-eye synthesized image applied to display a 3-dimensional image by a process of connecting and synthesizing left-eye image strips set in the images and generates a right-eye synthesized image applied to display a 3-dimensional image by a process, of connecting and synthesizing right-eye image strips set in the images. The image synthesis unit performs a process of setting the left-eye image strip and the right-eye image strip in an allowable range of set positions of the left-eye image strip and the right-eye image strip used to generate the left-eye synthesized image and the right-eye synthesized image, which are at different observing points, applicable to display the 3-dimensional images by acquiring the allowable range from a memory or calculating the allowable range.

In the image processing apparatus according to the embodiment of the invention, the image synthesis unit may perform a process of acquiring, as the allowable range, an allowable minimum value and an allowable maximum value of a strip offset which is a gap distance between a 2-dimensional synthesized image strip which is an image cutout area applied to generate a 2-dimensional synthesized image and the left-eye image strip or the right-eye image strip from the memory or calculating the allowable minimum value and allowable maximum value as the allowable range.

In the image processing apparatus according to the embodiment of the invention, the image synthesis unit may perform a process of acquiring a strip set position, at which an overlapping area between setting areas of the left-eye image strip and the right-eye image strip does not occur, as the allowable range from the memory or calculating the strip set position as the allowable range.

In the image processing apparatus according to the embodiment of the invention, the image synthesis unit may perform a process of acquiring a strip set position, at which the setting areas of the left-eye image strip and the right-eye image strip are within a storage range of an image memory, as the allowable range from the memory or calculating the strip set position as the allowable range.

In the image processing apparatus according to the embodiment of the invention, the allowable minimum value of the strip offset may be a value calculated by applying parameters (a) to (c): (a) a view angle $\mu$ per pixel of an image capturing element of an image capturing apparatus capturing the plurality of images; (b) a movement angular velocity d when the image capturing apparatus capturing the plurality of images captures the image; and (c) a continuous shooting speed s of the image capturing apparatus capturing the plurality of images. The image synthesis unit may perform a process of calculating the allowable minimum value of the strip offset by applying the parameters (a) to (c) or acquiring the calculated value from the memory.

In the image processing apparatus according to the embodiment of the invention, the view angle $\mu$ per pixel of the image capturing element may be a value calculated based on a view angle $\alpha$ per each of the plurality of images. The view angle $\alpha$ may be a value calculated by applying each of parameters (d) to (f): (d) a focal distance f of a lens of the image capturing apparatus capturing the plurality of images; (e) a pixel pitch p of the image capturing element of the image capturing apparatus capturing the plurality of images; and (f) the number h of horizontal pixels of the image capturing element of the image capturing apparatus capturing the plurality of images. The image synthesis unit may perform a process of calculating the allowable minimum value of the strip offset by applying the parameters (a) to (f) or acquiring the calculated value from the memory.

In the image processing apparatus according to the embodiment of the invention, the allowable maximum value of the strip offset may be a value calculated based on a horizontal effective size t of one image corresponding to the storage range of the image memory and the allowable minimum value of the strip offset. The image synthesis unit may perform a process of calculating the allowable maximum value of the strip offset by applying the horizontal effective size t and the allowable minimum value of the strip offset or acquiring the calculated value from the memory.

According to another embodiment of the invention, there is provided an image capturing apparatus including: a lens unit applied to capture an image; an image capturing element performing photoelectric conversion of the photographed image; and the image synthesis unit of the above-described image processing apparatus.

According to still another embodiment of the invention, there is provided an image processing method of performing an image synthesis process in an image processing apparatus. The image processing method includes the step of generating, by an image synthesis unit, a synthesized image by inputting a plurality of images photographed at different positions and connecting strip areas cut from the images. The step of generating the synthesized image includes the steps of: setting a left-eye image strip and a right-eye image strip in an allowable range of set positions of the left-eye image strip and the right-eye image strip used to generate a left-eye synthesized image and a right-eye synthesized image, which are at different observing points, applicable to display 3-dimensional images by acquiring the allowable range from a memory or calculating the allowable range; generating the left-eye synthesized image applied to display the 3-dimensional image by a process of connecting and synthesizing the left-eye image strips set in the images; and generating the right-eye synthesized image applied to display the 3-dimensional image by a process of connecting and synthesizing the right-eye image strips set in the images.

According to still another embodiment of the invention, there is provided a program causing an image processing apparatus to execute an image synthesis process. The program causes an image synthesis unit to execute a step of generating a synthesized image by inputting a plurality of images photographed at different positions and connecting strip areas cut from the images. In the step of generating the synthesized image, the program executes the steps of: setting a left-eye image strip and a right-eye image strip in an allowable range of set positions of the left-eye image strip and the right-eye image strip used to generate a left-eye synthesized image and a right-eye synthesized image, which are at different observing points, applicable to display 3-dimensional images by acquiring the allowable range from a memory or calculating the allowable range; generating the left-eye synthesized image applied to display the 3-dimensional image by a process of connecting and synthesizing the left-eye image strips set in the images; and generating the right-eye synthesized image applied to display the 3-dimensional image by a process of connecting and synthesizing the right-eye image strips set in the images.

The program according to the embodiment of the invention is a program which can be supplied to, for example, an information processing apparatus or a computer system capable of executing various program codes from a recording medium or a communication medium supplied in a computer readable format. By supplying the program in the computer readable format, the processes are executed in accordance with the program on the information processing apparatus or the computer system.

The other goals, features, and advantages of the embodiments of the invention are clarified in the detailed description based on the embodiment of the invention and the accompanying drawings described below. The system in the specification has a logical collective configuration of a plurality of apparatuses and is not limited to a case where the apparatuses with each configuration are included in the same chassis.

According to the embodiment of the invention, there is provided the image synthesis unit generating the left-eye synthesized image and the right-eye synthesized image applied to display the 3-dimensional images by connecting the strip areas cut from the plurality of images photographed at the different positions. The image synthesis unit performs the process of setting the left-eye image strip and the right-eye image strip in the allowable range of set positions of the left-eye image strip and the right-eye image strip used to generate the left-eye synthesized image and the right-eye synthesized image, which are at the different observing points, applicable to display the 3-dimensional images by acquiring the allowable range from the memory or calculating the allowable range. Specifically, the image synthesis unit determines the strip set positions within the storage range of the image memory so that the overlapping area between setting areas of the left-eye image strip and the right-eye image strip does not occur. Accordingly, in the strip setting process, it is possible to reliably generate the left-eye synthesized image and the right-eye synthesized image applicable to display the 3-dimensional images.

BRIEF DESCRIPTION OF THE DRAWINGS

FIGS. 2A, 2B1, and 2B2 are explanatory diagrams illustrating a process of generating a left-eye image (L image) and a right-eye image (R image) applied to display a 3-dimensional (3D) image.

FIGS. 4A to 4C are explanatory diagrams illustrating an inversion model using an imaginary image capturing surface.

FIG. 7 is an explanatory diagram illustrating a process of connecting the strip areas and a process of generating a 3D left-eye synthesized image (3D panorama L image) and a 3D right-eye synthesized image (3D panorama R image).

FIG. 10 is an explanatory diagram illustrating the problem when the overlapping area is set between the two strip areas.

FIG. 12 is a flowchart illustrating the order of an image photographing process and an image synthesis process performed by the image processing apparatus according to the embodiment of the invention.

DESCRIPTION OF THE PREFERRED EMBODIMENTS

Hereinafter, an image processing apparatus, an image capturing apparatus, an image processing method, and a program according to an embodiment of the invention will be described with reference to the drawings. The description will be made in the following order.

1. Basic of Process of Generating Panorama Image and Generating 3-Dimensional (3D) Image 2. Problems in Generation of 3D Image Using Strip Areas of Plurality of Images Photographed When Camera Is Moved 3. Exemplary Configuration of Imaging Processing Apparatus According to Embodiment of the Invention 4. Orders of Image Photographing Process and Image Processing Process 5. Control to Prevent Occurrence of Overlapping Area of Strips 6. Upper limit of Strip Offset 7. Process of Controlling Strip Offset 8. Specific Example of Configuration and Process of Image Synthesis Unit 1. Basic of Process of Generating Panorama Image and Generating 3-Dimensional (3D) Image The present invention relates to a process of generating left-eye images (L images) and right-eye images (R images) applied to display 3-dimensional (3D) images by connecting areas (strip areas) cut in a strip shape from images using the plurality of images continuously photographed while an image capturing apparatus (camera) is moved.

Figure 1:
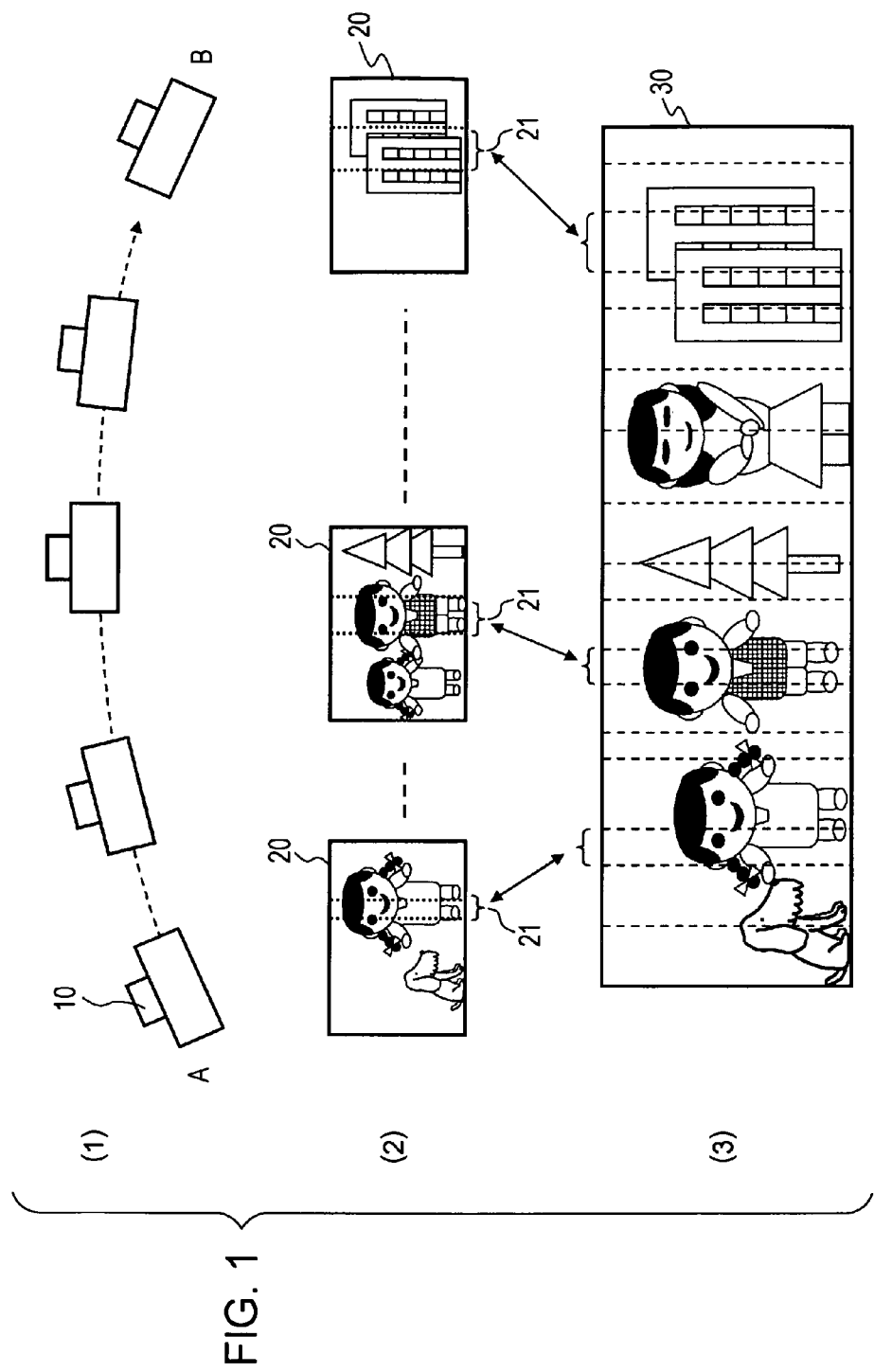
FIG. 1 is an explanatory diagram illustrating a process of generating a panorama image.

A camera capable of generating 2-dimensional panorama images (2D panorama images) using a plurality of images continuously photographed while the camera is moved has already been realized and used. First, a process of generating panorama images (2D panorama images) as 2-dimensional synthesized images will be described with reference to FIG. 1. FIG. 1 is an explanatory diagram illustrating (1) a photographing process, (2) a photographed image, and (3) 2-dimensional synthesized images (2D panorama images).

A user sets a camera 10 to a panorama photographing mode and holds the camera 10, and then presses down a shutter and moves the camera 10 from the left (point A) to the right (point B), as shown in Part (1) of FIG. 1. The camera 10 performs a continuous image photographing process when detecting that the user presses down the shutter in the panorama photographing mode. For example, the camera continuously photographs approximately several tens of images to about a hundred images.

These images are images 20 shown in Part (2) of FIG. 1. The plurality of images 20 are continuously photographed images while the camera 10 is moved and are images from different viewing points. For example, the images 20 obtained by photographing 100 images from different viewing points are sequentially recorded on a memory. A data processing unit of the camera 10 reads the plurality of images 20 from memory shown in Part (2) of FIG. 1 from the memory, cuts strip areas 21 to generate a panorama image from each image, performs a process of connecting the cut strip areas to generate a 2D panorama image 30 shown in Part (3) of FIG. 1.

The image processing apparatus or the image capturing apparatus according to an embodiment of the invention performs the image photographing process shown in Part (1) of FIG. 1, that is, a process of generating left-eye images (L images) and right-eye images (R images) applied to display 3-dimensional (3D) images using the plurality of images continuously photographed while the camera is moved, as shown in Part (1) of FIG. 1.

A basic of the process of generating the left-eye images (L images) and the right-eye images (R images) will be described with reference to FIGS. 2A, 2B1, and 2B2.

In FIG. 2A, one image 20 photographed in the panorama photographing process in Part (2) of FIG. 1 is shown.

Like the process of generating the 2D panorama image described with reference to FIG. 1, left-eye images (L images) and right-eye images (R images) applied to display a 3-dimensional (3D) image is generated by cutting and connecting predetermined strip areas from the images 20.

In this case, the left-eye images (L images) and the right-eye images (R images) are different in the strip area which is the cutout area.

As shown in FIG. 2A, a left-eye image strip 51 (L image strip) and a right-eye image strip 52 (R image strip) are different in the cutout position. In FIGS. 2A, 2B1, and 2B2, only one image 20 is shown, but the left-eye image strip (L image strip) and the right-eye image strip (R image strip) are set at different cutout positions in each of the plurality of images photographed while the camera is moved shown in Part (2) of FIG. 1.

Thereafter, the 3D left-eye panorama image (3D panorama L image) in FIG. 2B1 can be generated by collecting and connecting only the left-eye image strips (L image strip).

In addition, the 3D right-eye panorama image (3D panorama R image) in FIG. 2B2 can be generated by collecting and connecting only the right-eye image strips (R image strip).

By connecting the strips set at different cutout positions in the plurality of images photographed while the camera is moved, the left-eye images (L images) and the right-eye images (R images) applied to display the 3-dimensional (3D) images can be generated. The principle will be described with reference to FIG. 3.

Figure 3:
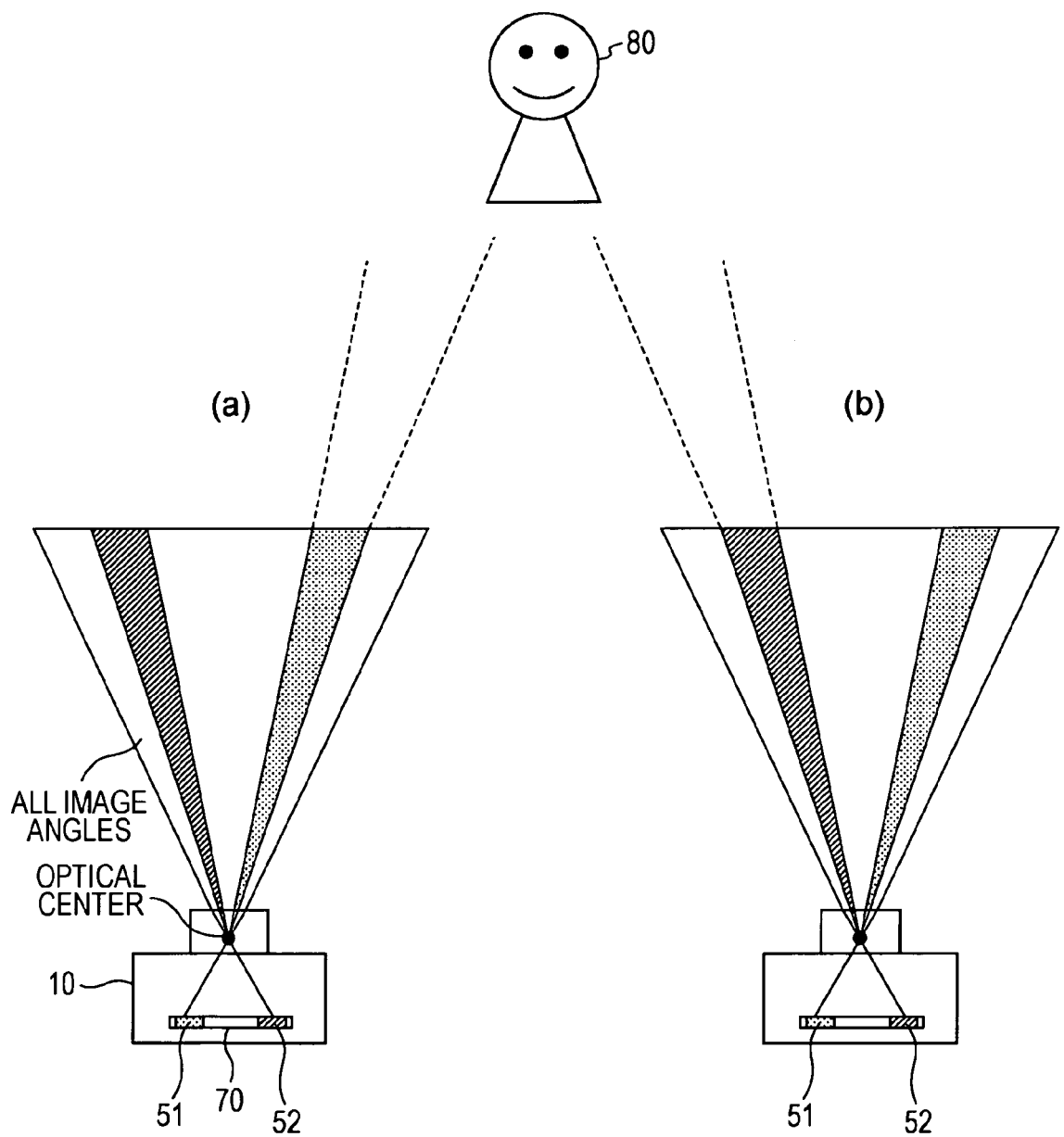
FIG. 3 is an explanatory diagram illustrating a principle of generating the left-eye image (L image) and the right-eye image (R image) applied to display the 3-dimensional (3D) image.

FIG. 3 is a diagram illustrating a state where the camera 10 is moved to two photographing positions (a) and (b) to photograph a subject 80. As an image of the subject 80 at the position (a), an image observed from the left side is recorded in the left-eye image strip (L image strip) 51 of the image capturing element 70 of the camera 10. Next, as an image of the subject 80 at the position (b) to which the camera 10 is moved, an image observed from the right side is recorded in the right-eye image strip (R image strip) 52 of the image capturing element 70 of the camera 10.

In this way, the images obtained by observing the same subject at the different observing points are recorded in predetermined areas (strip areas) of the image capturing element 70.

By extracting the images individually, that is, by collecting and connecting only the left-eye image strips (L image strips), the 3D left-eye panorama image (3D panorama L image) in FIG. 2B1 is generated. In addition, by collecting and connecting only the right-eye image strips (R image strips), the 3D right-eye panorama image (3D panorama R image) in FIG. 2B2 is generated.

In FIG. 3, the camera 10 is moved from the left side to the right side relative to the subject 80 in a cross manner to facilitate understanding. However, it is not necessary that the camera 10 is moved relative to the subject 80 in a cross manner. As long as the images are recorded in predetermined areas of the image capturing element 70 of the camera 10 from different observing points, the left-eye image and the right-eye image applied to display the 3D images can be generated.

Next, an inversion model using an imaginary image capturing surface to be applied will be described below with reference to FIGS. 4A to 4C. FIGS. 4A to 4C are diagram illustrating an image capturing configuration, a normal model, and an inversion model, respectively.

The drawing of the image capturing configuration illustrated in FIG. 4A shows a processing configuration when the same panorama image as that described with reference to FIG. 3 is photographed.

In FIG. 4B, an exemplary image photographed by the image capturing element 70 of the camera 10 in the photographing process shown in FIG. 4A is shown.

In the image capturing element 70, a left-eye image 72 and a right-eye image 73 are vertically inverted and recorded, as shown in FIG. 4B. Since it is difficult to make description using the inverted image, the inversion model shown in FIG. 4C will be described below.

The inversion model is a model frequently used to describe an image of an image capturing apparatus.

In the inversion model shown in FIG. 4C, it is assumed that an imaginary image capturing element 101 is set in the front of an optical center 102 corresponding to the focus of the camera and a subject image is photographed on the imaginary image capturing element 101. As shown in FIG. 4C, a subject 91 on the front left side of the camera is photographed on the left of the imaginary image capturing element 101 and a subject 92 on the front right side of the camera is photographed on the right of the imaginary image capturing element 101 and the subjects are set not to be vertically inverted, thereby reflecting the positional relationship of the actual subjects without inversion. That is, the images on the imaginary image capturing element 101 are the same image data as the actually photographed image data.

The description will be made below using the inversion model using the imaginary image capturing element 101. However, as shown in FIG. 4C, on the imaginary image capturing element 101, a left-eye image (L image) 111 is photographed on the right of the imaginary image capturing element 101 and a right-eye image (R image) 112 is photographed on the left of the imaginary image capturing element 101.

2. Problems in Generation of 3D Image Using Strip Areas of Plurality of Images Photographed when Camera is Moved Next, problems in generation of the 3D image using the strip areas of a plurality of images photographed when the camera is moved will be described.

Figure 5:
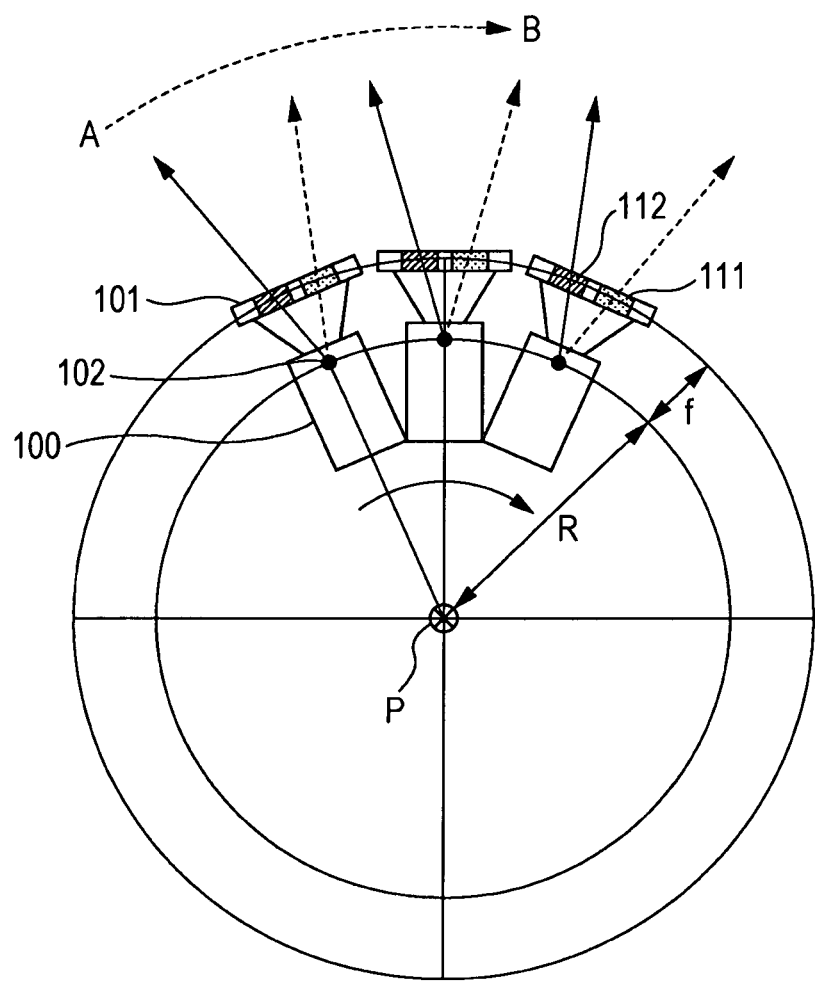
FIG. 5 is an explanatory diagram illustrating a model for a process of photographing a panorama image (3D panorama image).

A photographing model shown in FIG. 5 is assumed as a model for a process of photographing a panorama image (3D panorama image). As shown in FIG. 5, the camera 100 is placed so that the optical center 102 of the camera 100 is set to be distant by a distance R (radius of rotation) from a rotational axis P which is a rotation center.

The imaginary image capturing surface 101 is set to be distant by a focal distance f from the optical center 102 and be placed outside from the rotational axis P.

With such a configuration, the camera 100 is rotated clockwise (direction from A to B) about the rotational axis P to photograph a plurality of images continuously.

At each photographing point, an image of the left-eye image strip 111 and an image of the right-eye image strip 112 are recorded on the imaginary image capturing element 101.

Figure 6:
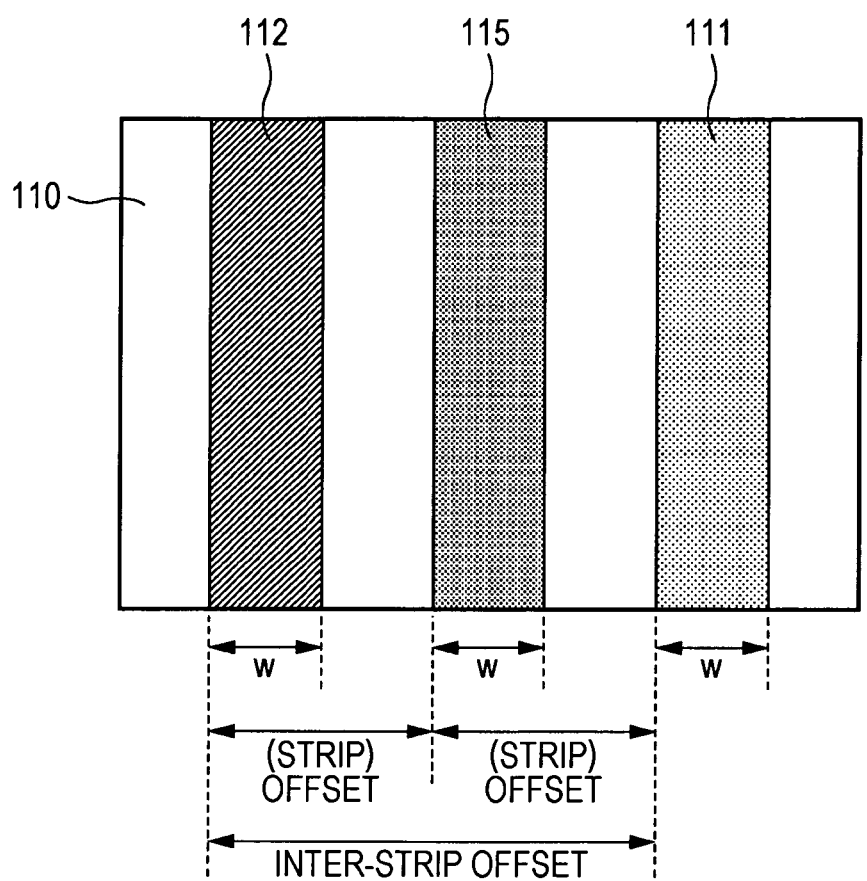
FIG. 6 is an explanatory diagram illustrating an image photographed in the process of photographing the panorama image (3D panorama image) and an exemplary process of setting strips for a left-eye image and a right-eye image.

The recorded image has a structure shown in FIG. 6, for example.

FIG. 6 is a diagram illustrating an image 110 photographed by the camera 100. The image 110 is the same as the image on the imaginary image capturing surface 101.

In the image 110, as shown in FIG. 6, an area (strip area) offset left from the center of the image and cut in a strip shape is referred to as the right-eye image strip 112 and an area (strip area) offset right from the center of the image and cut in a strip shape is referred to as the left-eye image strip 111.

In FIG. 6, a 2D panorama image strip 115 used to generate a 2-dimensional (2D) panorama image is shown as a reference.

As shown in FIG. 6, a distance between the 2D panorama image strip 115, which is a 2-dimensional synthesized image strip, and the left-eye image strip 111 and a distance between the 2D panorama image strip 115 and the right-eye image strip 112 is defined as an "offset" or a "strip offset".

A distance between the left-eye image strip 111 and the right-eye image strip 112 is defined as an "inter-strip offset".

An expression of inter-strip offset=(strip offset)×2 is satisfied.

A strip width w is a width w common to the 2D panorama image strip 115, the left-eye image strip 111, and the right-eye image strip 112. The strip width is varied depending on the movement speed of the camera. When the movement speed of the camera is fast, the strip width w is enlarged. When the movement speed of the camera is slow, the strip width w is narrowed. This point will be described in more detail below.

The strip offset or the inter-strip offset can be set to have various values. For example, when the strip offset is large, a parallax between the left-eye image and the right-eye image becomes larger. When the strip offset is small, the parallax between the left-eye image and the right-eye image becomes smaller.

In a case of strip offset=0, a relation of left-eye image strip 111=right-eye image strip 112=2D panorama image strip 115 is satisfied.

In this case, a left-eye synthesized image (left-eye panorama image) obtained by synthesizing the left-eye image strip 111 and a right-eye synthesized image (right-eye panorama image) obtained by synthesizing the right-eye image strip 112 are completely the same image, that is, become the same as the 2-dimensional panorama image obtained by synthesizing the 2D panorama image strip 115. Therefore, these images may not be used to display a 3-dimensional image.

The length of the strip width w, the strip offset, or the inter-strip offset will be described as a value defined by the number of pixels.

The data processing unit of the camera 100 connects the strip areas cut from the respective images by calculating motion vectors between the images photographed continuously while the camera 100 is moved and sequentially determining the strip areas cut from the respective images while the positions of the strip areas are aligned to connect the patterns of the above-described strip areas.

That is, the left-eye synthesized image (left-eye panorama image) is generated by selecting, connecting, and synthesizing only the left-eye image strips 111 from the respective image and the right-eye synthesized image (right-eye panorama image) is generated by selecting, connecting, and synthesizing only the right-eye image strips 112 from the respective image.

Part (1) of FIG. 7 is a diagram illustrating a process of connecting the strip areas. It is assumed that a photographing time interval of each image is Δt and n+1 images are photographed during T=0 to nΔt. The strip areas extracted from the n+1 images are connected.

When the 3D left-eye synthesized image (3D panorama L image) is generated, only the left-eye image strips (L image strips) 111 are extracted and connected. When the 3D right-eye synthesized image (3D panorama R image) is generated, only the right-eye image strips (R image strips) 112 are extracted and connected.

The 3D left-eye synthesized image (3D panorama L image) in Part (2a) of FIG. 7 is generated by collecting and connecting only the left-eye image strips (L image strips) 111.

In addition, the 3D right-eye synthesized image (3D panorama R image) in Part (2b) of FIG. 7 is generated by collecting and connecting only the right-eye image strips (R image strips) 112.

The 3D left-eye synthesized image (3D panorama L image) in Part (2a) of FIG. 7 is generated by joining the strip areas offset right from the center of the image 100, as described with reference to FIGS. 6 and 7.

The 3D right-eye synthesized image (3D panorama R image) in Part (2b) of FIG. 7 is generated by joining the strip areas offset left from the center of the image 100.

Basically the same subject is captured on the two images, as described above with reference to FIG. 3. However, a parallax occurs since the same subject is photographed at the different positions. When the two images having the parallax is shown on a display apparatus capable of displaying a 3D (stereo) image, the photographed subject can be displayed 3-dimensionally.

In addition, there are various 3D display methods.

For example, the method includes a 3D image display method corresponding to a passive glasses method in which images observed by right and left eyes are separated by polarization filters or color filters or a 3D image display method corresponding to an active glasses method in which images observed by opening and closing a liquid crystal shutter alternately right and left are separated temporally in an alternate manner for right and left eyes.

The left-eye image and the right-eye image generated in the above-described process of connecting the strips are applicable to the above methods.

However, when the left-eye images and the right-eye images are generated by cutting the strip areas from the plurality of images photographed continuously while the camera 100 is moved, the images which may not be applied to a 3-dimensional (3D) image may be generated in some cases. Hereinafter, this problem will be described.

When one synthesized image such as a panorama image is generated by cutting the strip areas and connecting the cut strip areas, the strip width cut from each image is varied depending on a motion vector between the images. That is, the strip width cut from each image is varied depending on the movement speed of a camera. The correspondence between the movement speed of a camera and the strip width will be described with reference to FIGS. 8A to 8C.

Figure 8A:
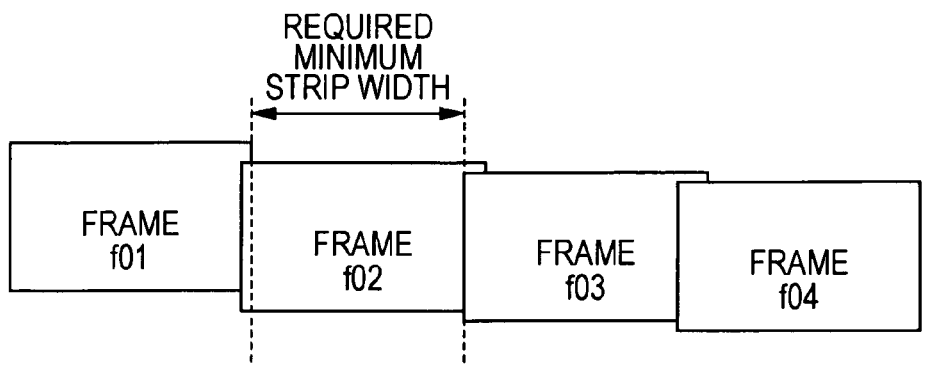
FIGS. 8A to 8C are explanatory diagrams illustrating a correspondence between the movement speed of a camera and a strip width.

When the movement speed of a camera is fast, as shown in FIG. 8A, overlapping areas between images (frames f01 to f04) photographed continuously are small. In this case, the strip width [w] to be extracted from each image is large.

Figure 8B:
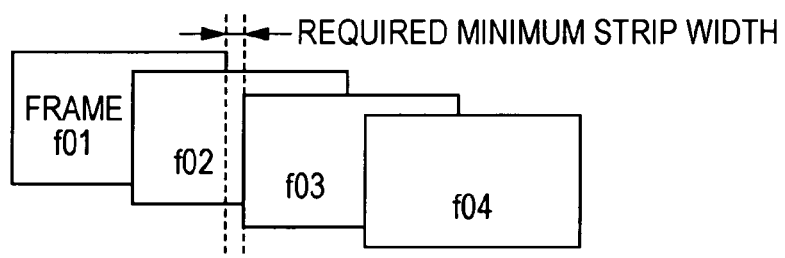

On the other hand, when the movement speed of the camera is slow, as shown in FIG. 8B, the overlapping areas between the images (frames f01 to f04) photographed continuously are large. In this case, the strip width [w] to be extracted from each image is narrow.

Figure 8C:
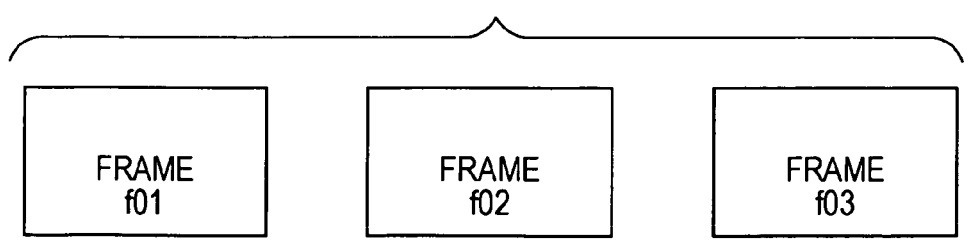

For example, when the movement speed of the camera is too fast, as shown in FIG. 8C, a panorama image obtained by connecting the cutout parts of the images may not be generated.

The setting of the strip width [w] is applied to a 2D panorama image strip, as in the respective strips of the right-eye image and the left-eye image used to synthesize the 3D image.

However, when the strips of the left-eye image and the right-eye image applied to display the 3D images are set in each photographed image, the following problems may occur.

A first problem occurs since a 3D image may not be established when there is no sufficient interval between the left-eye image strip area and the right-eye image strip area set in one image.

This problem is caused since no image of a subject is acquired from a different observing point. That is, in some cases, a parallax image may not be acquired from two different observing points.

This situation occurs when there is no sufficient interval between the left-eye image strip area and the right-eye image strip area set in one image and thus an overlapping area between the two strip areas is set. When the overlapping area occurs, a common use area where the same image is used for both the left eye and the right eye may occur in one photographed image. As a consequence, the common use area becomes an area where an image is not set from two different observing points.

This problem will be described with reference to FIGS. 9A, 9B, and 10.

Figure 9A:
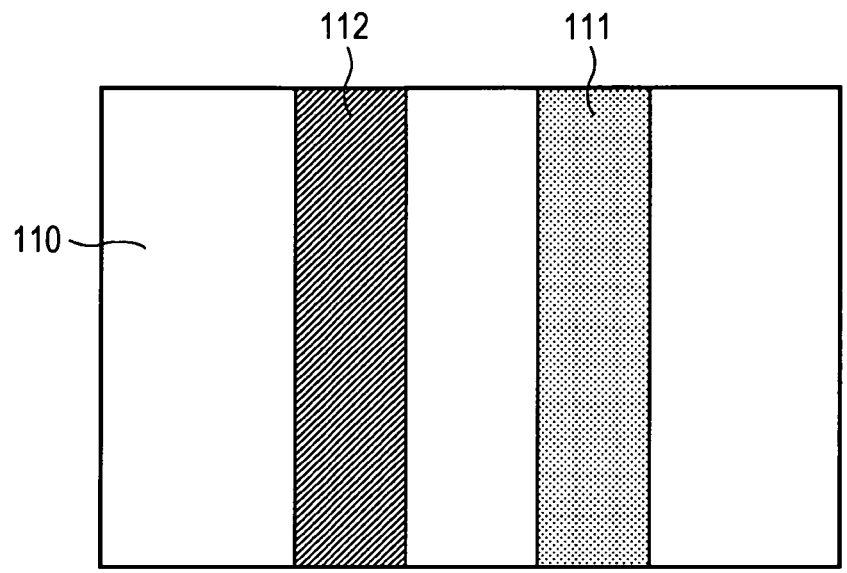
FIGS. 9A and 9B are explanatory diagrams illustrating a problem when an overlapping area is set between two strip areas.
Figure 9B:
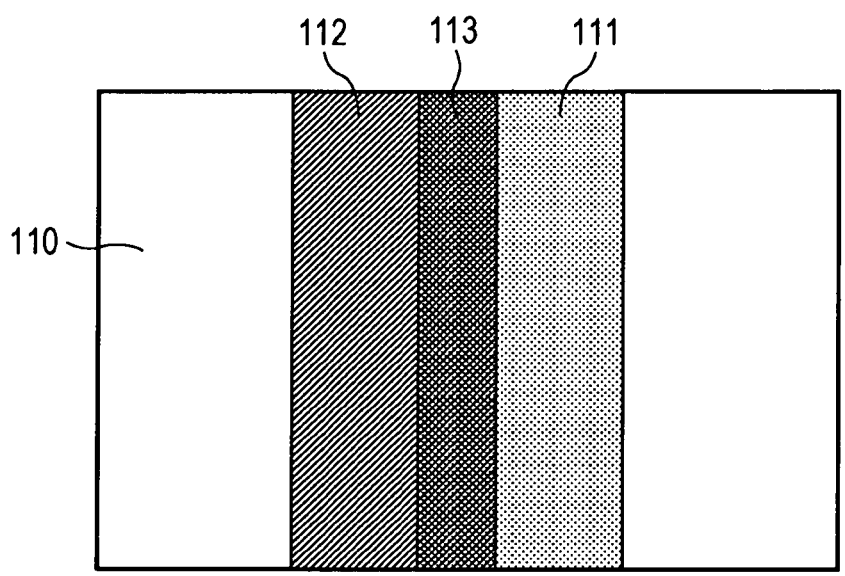

In FIGS. 9A and 9B, two examples in which strip areas are set in one photographed image are shown.

In FIG. 9A, the example in which there is no overlapping area between the strip areas.

In FIG. 9B, the example in which there is an overlapping area between the strip areas.

In the example shown in FIG. 9A, the left-eye image strip area 111 and the right-eye image strip area 112 set in one image 100 are spaced from each other, and thus there is no overlapping area between the left-eye image strip area 111 and the right-eye image strip area 112.

On the other hand, in the example shown in FIG. 9B, the left-eye image strip area 111 and the right-eye image strip area 112 set in one image 100 overlap with each other, and thus there is an overlapping area 113 between the left-eye image strip area 111 and the right-eye image strip area 112.

When there is the overlapping area 113 between the left-eye image strip area 111 and the right-eye image strip area 112, as in FIG. 9B, a parallax image to be applied to a 3D image may not be acquired. The specific example will be described with reference to FIG. 10.

In Part (1) of FIG. 10, images f01 and f02 obtained by photographing subjects a to d are shown. The images f01 and f02 are images obtained by photographing the subjects continuously while the camera is moved.

The subject a to d are recorded in the frame f01 shown in Part (1) of FIG. 10 and the subject a to d are also recorded in the frame f02 at the position deviated by a movement amount of the camera.

The subjects a and b are recorded in a right-eye image strip f01R of the previously photographed frame f01 and the subjects b and c are recorded in a left-eye image strip f01L thereof. There is an overlapping area in the right-eye image strip f01R and the left-eye image strip f01L and the subject b is recorded in the overlapping area.

The subjects c and d are recorded in a right-eye image strip f02R of the subsequently photographed frame f02 and the subject d is recorded in a left-eye image strip f02L thereof.

There is an overlapping area in the right-eye image strip f02R and the left-eye image strip f02L, and a part of the subject d is recorded in the overlapping area.

When a left-eye panorama image and a right-eye panorama image applied to display a 3D image are generated from the images f01, f02, and so on, the left-eye panorama image is generated by an image synthesis process of extracting and connecting only the left-eye image strips.

The right-eye panorama image is generated by an image synthesis process of extracting and connecting only the right-eye image strips.

The synthesized images obtained as the result of the image synthesis process are two panorama images shown in Part (2) of FIG. 10.

In the two synthesized images (panorama images) shown in Part (2) of FIG. 10, the subject b included in the right-eye panorama image is an image recorded in the right-eye image strip f01R of the image frame f01L shown in Part (1) of FIG. 10.

The subject b included in the left-eye panorama image is also an image recorded in the left-eye image strip f01L of the image frame f01L shown in Part (1) of FIG. 10.

That is, the image of the subject b included in the two panorama images is the image in the overlapping area of the strips and may be an image obtained by photographing the frame f01 at one observing point.

The image of the subject b is an image photographed at the same observing point and commonly used in the left-eye panorama image and the right-eye panorama image, and thus does not have the configuration, of the two images usable for a 3D image with a parallax. As a consequence, although theses panorama images are used to display a 3D image, only the same image as the part of the subject b is displayed, and thus is displayed not as a 3D image but as a planar 2-dimensional (2D) image.

When the overlapping area occurs in the strip areas, a synthesized image (panorama image) in which a 2D image is displayed in a partial area and a 3D image is displayed in a partial area. Therefore, a discontinuous stereoscopic area occurs in a part of the synthesized image. When the synthesized image is displayed on a 3D (stereo) display apparatus, the synthesized image may be viewed just as the image sinks or flies unnaturally when viewing the synthesized image.

In order to prevent the overlapping area from occurring between the left-eye image strip area and the right-eye image strip area, it is necessary to take care to perform the photographing process such as movement of the camera at a predetermined movement speed. On the other hand, when the photographing process of enlarging a space between the strip areas to prevent the overlap between the strip areas used for the left eye and the right eye is performed, the necessary strip areas may be present beyond the image area outside the end of the image. When this situation occurs, a problem may arise in that it is difficult to perform the process of connecting the images.

According to the embodiment of the invention, the synthesized image observed at the two different observing points is reliably generated as a 3D image by the image synthesis process of connecting the strip areas set in the plurality of images obtained by photographing the left-eye image and the right-eye image applied to the 3D image while the camera is moved. Hereinafter, this process will be described in more detail.

3. Exemplary Configuration of Image Processing Apparatus According to Embodiment of the Invention First, referring to FIG. 11, an exemplary configuration of the image capturing apparatus will be described as an example of the image processing apparatus according to an embodiment of the invention.

An image capturing apparatus 200 shown in FIG. 11 corresponds to a camera 10 described with reference to FIG. 1. For example, a user holds the image capturing apparatus 200 with the hands to photograph a plurality of images continuously in a panorama photographing mode.

Light from a subject is incident on an image capturing element 202 through a lens system 201. The image capturing element 202 is formed by, for example, a CCD (Charge Coupled Device) sensor or a CMOS (Complementary Metal Oxide Semiconductor) sensor.

The subject image incident on the image capturing element 202 is transformed into an electric signal by the image capturing element 202. Although not illustrated, the image capturing element 202 includes a predetermined signal processing circuit converting the converted electric signal into digital image data and supplying the converted digital image data to an image signal processing unit 203.

The image signal processing unit 203 performs image signal processing such as gamma correction or contour enhancement correction and displays an image signal as the signal processing result on a display unit 204.

The image signal processed by the image signal processing unit 203 is supplied to units such as an image memory (for the image synthesis process) 205 serving as an image memory used for the image synthesis process, an image memory (for movement amount detection) 206 serving as an image memory used to detect the movement amount between images photographed continuously, and a movement amount calculation unit 207 calculating the movement amount between the images.

The movement amount calculation unit 207 acquires both an image signal supplied from the image signal processing unit 203 and the preceding image of one frame stored in the image memory (for movement amount detection) 206 and detects the movement amounts of the present image and the preceding image of one frame. For example, the movement amount calculation unit 207 performs a matching process of matching the pixels of two images photographed continuously, that is, the matching process of determining the photographed areas of the same subject to calculate the number of pixels moved between the images. The matching process is performed basically on the assumption that a subject stops. When there is a moving subject, a motion vector different from the motion vector of the entire image is detected, but the motion vector corresponding to the moving subject is processed as exception of the detection target. That is, the motion vector (GMV: Global Motion Vector) corresponding to the movement of the entire image occurring with the movement of the camera is detected.

The movement amount is calculated, for example, as the number of movement pixels. The movement amount of the image n obtained calculating the detected movement amount (the number of pixels) in comparison to the image n and the preceding image n−1 is stored as a movement amount corresponding to the image n in the movement amount memory 208.

The image memory (for the image synthesis process) 205 is a memory which stores the images to perform the image synthesis process of the images photographed continuously, that is, to generate the panorama images. The image memory (for the image synthesis process) 205 may store all of the images such as n+1 images photographed in the panorama photographing mode. For example, the image memory 205 may select and store only the middle areas of the images in which the strip areas necessary to generate the panorama images are guaranteed by cutting the ends of the images. With such a configuration, the necessary memory capacity can be reduced.

After the photographing process ends, the image synthesis unit 210 performs the image synthesis process of extracting the images from the image memory (for the image synthesis process) 205, cutting and connecting the strip areas, and the cut strip areas to generate the left-eye synthesized image (left-eye panorama image) and the right-eye synthesized image (right-eye panorama image).

After the photographing process ends, the image synthesis unit 210 inputs the plurality of images (or partial images) stored during the photographing process in the image memory (for the image synthesis process) 205. In addition, the image synthesis unit 210 also inputs the movement amounts corresponding to the images stored in the movement amount memory 208, and allowable offset information, which is used to determine the setting positions of the left-eye image strip and the right-eye image strip, or various parameters, which are used to calculate allowable offset amounts from the memory 209.

The image synthesis unit 210 sets the left-eye image strip and the right-eye image strip in the images photographed continuously using the input information and generates the left-eye synthesized image (the left-eye panorama image) and the right-eye synthesized image (the right-eye panorama image) by performing the process of cutting and connecting the image strips. The image synthesis unit 210 performs a compression process such as JPEG on the images, and then records the compressed images in a record unit (recording media) 211.

A specific exemplary configuration and a process of the image synthesis unit 210 will be described in more detail below.

The record unit (recording media) 211 stores the synthesized image synthesized by the image synthesis unit 210, that is, the left-eye synthesized image (the left-eye panorama image) and the right-eye synthesized image (the right-eye panorama image).

The record unit (recording media) 211 may be formed by any record medium as long as the record medium is capable of recording a digital signal. Examples of the record unit include a hard disk, a magneto-optical disk, a DVD (Digital Versatile Disc), an MD (Mini Disk), a semiconductor memory, and a magnetic tape.

Figure 11:
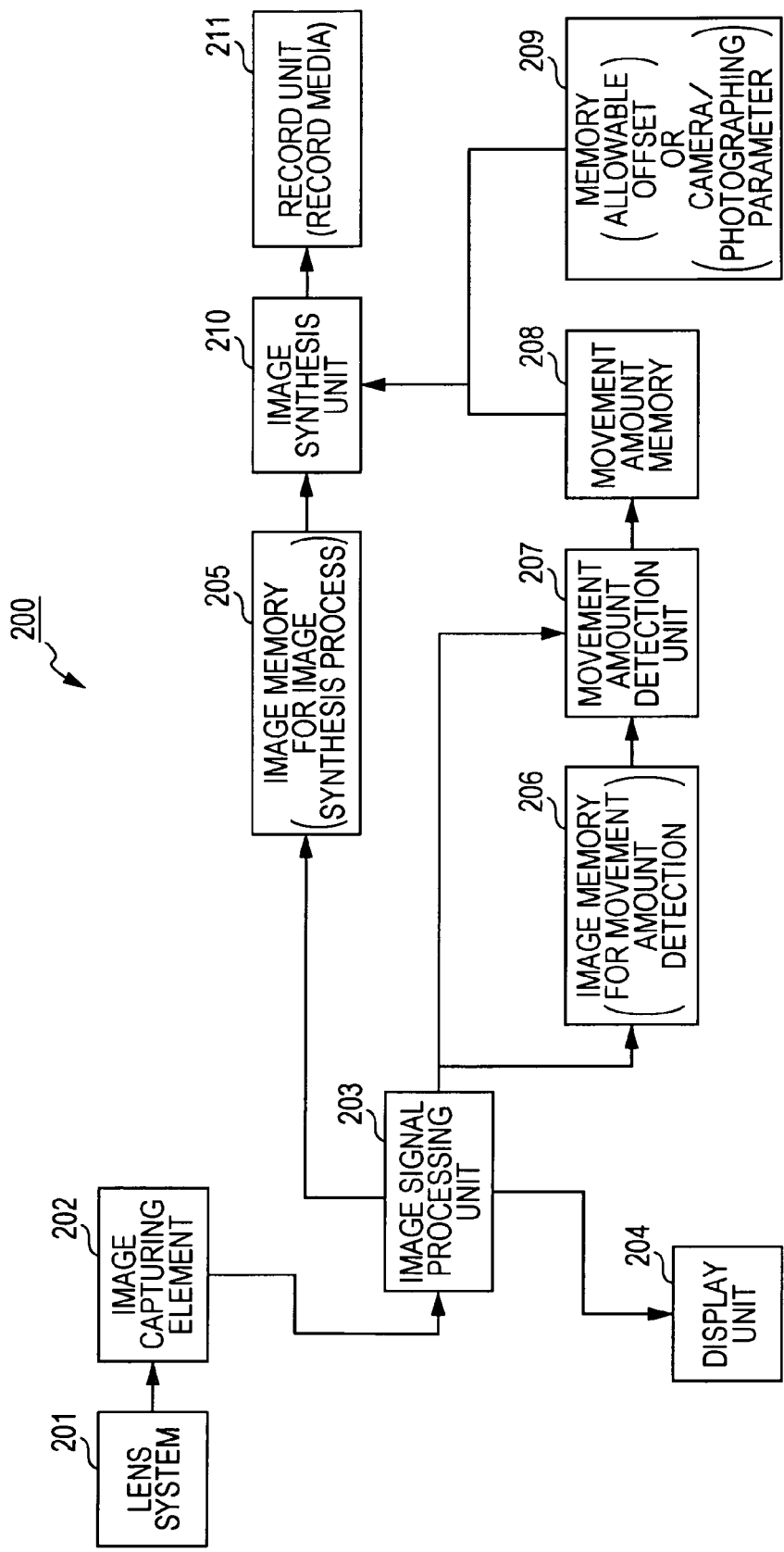
FIG. 11 is an explanatory diagram illustrating an exemplary configuration of the image capturing apparatus which is an example of the image processing apparatus according to an embodiment of the invention.

Although not illustrated in FIG. 11, the image capturing apparatus 200 includes a shutter operated by the user, an input operation unit performing various kinds of inputting such as a mode setting process, a control unit controlling the processes performed in the image capturing apparatus 200, a program processing each constituent unit other than the control unit, and a storage unit (memory) storing the parameters in addition to the configuration shown in FIG. 11.

The processing of the constituent units of the image capturing apparatus 200 shown in FIG. 11 and processes of inputting and outputting data are performed under the control of the control unit of the image capturing apparatus 200. The control unit reads the programs stored in advance in the memory of the image capturing apparatus 200 and performs all of the controls, such as a process of acquiring the photographed images, a process of processing data, a process of generating the synthesized images, a process of recording the generated synthesized images, and a display process, performed in the image capturing apparatus 200 in accordance with the program.

4. Orders of Image Photographing Process and Image Processing Process

Next, exemplary orders of the image photographing process and the image synthesis process performed in the image processing apparatus according to the embodiment of the invention will be described with reference to the flowchart shown in FIG. 12.

The process of the flowchart shown in FIG. 12 is performed under the control of the control unit of the image capturing apparatus 200, for example, shown in FIG. 11.

The process of the steps in the flowchart shown in FIG. 12 will be described.

First, a hardware diagnosis or initialization is performed by turning on the image processing apparatus (for example, the image capturing apparatus 200), and then the process proceeds to step S101.

In step S101, various photographing parameters are calculated. In step S101, for example, information regarding lightness identified by an exposure meter is acquired and the photographing parameters such as an aperture value or a shutter speed are calculated.

Subsequently, the process proceeds to step S102 and the control unit determines whether a user operates the shutter. Here, it is assumed that a 3D panorama photographing mode is set in advance.

In the 3D panorama photographing mode, a user operates the shutter to photograph a plurality of images continuously, and a process is performed such that the left-eye image strip and the right-eye image strip are cut out from the photographed images and the left-eye synthesized image (panorama image) and the right-eye synthesized image (panorama image) applicable to display a 3D image are generated and recorded.

In step S102, when the control unit does not detect that the user operates the shutter, the process returns to step S101.

In step S102, on the other hand, when the control unit detects the user operates the shutter, the process proceeds to step S103.

In step S103, based on the parameters calculated in step S101, the control unit performs controlling to start the photographing process. Specifically, for example, the control unit adjusts a diaphragm driving unit of the lens system 201 shown in FIG. 11 to start photographing the images.

The image photographing process is performed to photograph the plurality of images continuously. The electric signals corresponding to the continuously photographed images are sequentially read from the image capturing element 202 shown in FIG. 11 to perform the processes such as gamma correction or contour enhancement correction in the image signal processing unit 203. Then, the processed results are displayed on the display unit 204 and are sequentially supplied to the memories 205 and 206 and the movement amount detection unit 207.

Next, the process proceeds to step S104 to calculate the movement amount between the images. This process is performed by the movement amount detection unit 207 shown in FIG. 11.

The movement amount detection unit 207 acquires both the image signal supplied from the image signal processing unit 203 and the preceding image of one frame stored in the image memory (for movement amount detection) 206 and detects the movement amounts of the present image and the image before one frame.

The calculated movement amounts correspond to the number of pixels calculated by performing the matching process of matching the pixels of two images photographed continuously, that is, the matching process of determining the photographed area of the same subject, as described above. Basically, the process is performed on the assumption that the subject stops. When there is the moving subject, the motion vector different from the motion vector of the entire image is detected, but the motion vector corresponding to the moving subject is processed as an exception of the detection target. That is, the motion vector (GMV: Global Motion Vector) corresponding to the movement of the entire image occurring with the movement of the camera is detected.

For example, the movement amount is calculated as the number of movement pixels. The movement amount of the image n obtained by comparing the image n to the preceding image n−1 and calculating the detected movement amount (the number of pixels) as a movement amount corresponding to the image n is stored in the movement amount memory 208.

The movement use storage process corresponds to the storage process of step S105. In step S105, the movement amount between the images detected in step S104 is stored in the movement amount memory 208 shown in FIG. 11 in association with the ID of each of the continuously photographed images.

Subsequently, the process proceeds to step S106 to store the image photographed in step S103 and processed by the image signal processing unit 203 in the image memory (for the image synthesis process) 205 shown in FIG. 11. As described above, the image memory (for the image synthesis process) 205 stores all of the images such as the n+1 images photographed in the panorama photographing mode (or the 3D panorama photographing mode), but may select and store, for example, only the middle areas of the images in which the strip areas necessary to generate the panorama images (the 3D panorama images) are guaranteed by cutting the ends of the images. With such a configuration, the necessary memory capacity can be reduced. Moreover, the image memory (for the image synthesis process) 205 may store the images after performing the compression process such as JPEG.

Subsequently, the process proceeds to step S107 and the control unit determines whether the user continues pressing down the shutter. That is, the control unit determines photographing end time.

When it is determined that the user continues pressing down the shutter, the process returns to step S103 to continue the photographing process, and the image of the subject is repeatedly captured.

On the other hand, when the user stops pressing down the shutter in step S107, the process proceeds to step S108 to perform the photographing end process.

When the continuous image photographing process ends in the panorama photographing mode, the process proceeds to step S108.

In step S108, the image synthesis unit 210 acquires an offset condition of the strip areas satisfying a generation condition of the left-eye image and the right-eye image formed as the 3D image, that is, the allowable offset amount from the memory 209. Alternatively, the image synthesis unit 210 acquires the parameters necessary for calculating the allowable offset amounts from the memory 209 and calculates the allowable offset amounts. This process will be described in detail below.

Subsequently, the process proceeds to step S109 to perform a first image synthesis process using the photographed images. The process proceeds to step S110 to perform a second image synthesis process using the photographed images.

The image synthesis processes of steps S109 and S110 are processes of generating the left-eye synthesized image and the right-eye synthesized image applied to display the 3D images. For example, the synthesized images are generated as the panorama images.

The left-eye synthesis image is generated by the image synthesis process of extracting and connecting only the left-eye image strips, as described above. Likewise, the right-eye synthesis image is generated by the image synthesis process of extracting and connecting only the right-eye image strips. As the result of the image synthesis process, two panorama images shown in Parts (2a) and (2b) of FIG. 7 are generated.

The image synthesis processes of steps S109 and S110 are performed using the plurality of images (or partial images) stored in the image memory (for the image synthesis process) 205 in the continuous image photographing process while it is determined that the user presses down the shutter in step S102 and then it is confirmed that the user stops pressing down the shutter in step S107.

When the image synthesis processes are performed, the image synthesis unit 210 acquires the movement amounts associated with the plurality of images from the movement amount memory 208 and acquires the allowable offset amounts from the memory 209. Alternatively, the image synthesis unit 210 acquires the parameters necessary for calculating the allowable offset amounts from the memory 209 and calculates the allowable offset amounts.

The image synthesis unit 210 determines the strip areas as the cutout areas of the images based on the movement amounts and the acquired or calculated allowable offset amounts.

That is, the strip area of the left-eye image strip used to form the left-eye synthesized image and the strip area of the right-eye image strip used to form the right-eye synthesized image are determined.

The left-eye image strip used to form the left-eye synthesized image is determined at the position offset by a predetermined amount on the right side from the middle of the image.

The right-eye image strip used to form the right-eye synthesized image is determined at the position offset by a predetermined amount on the left side from the middle of the image.

In the setting process of the strip areas, the image synthesis unit 210 determines the strip areas so as to satisfy the offset condition satisfying the generation condition of the left-eye image and the right-eye image formed as the 3D images. That is, the image synthesis unit 210 sets the offsets of the strips so as to satisfy the allowable offset amounts acquired from the memory or calculated based on the parameters acquired from the memory in step S108, and performs the image cutting. This process will be described in detail below.

The image synthesis unit 210 performs the image synthesis process by cutting and connecting the left-eye image strip and the right-eye image strip in the images to generate the left-eye synthesized image and the right-eye synthesized image.

When the images (or partial images) stored in the image memory (for the image synthesis process) 205 are data compressed by JPEG or the like, an adaptive decompression process of setting the image areas, where the images compressed by JPEG or the like are decompressed, only in the strip areas used as the synthesized images may be performed based on the movement amounts between the images calculated in step S104.

In the processes of steps S109 and S110, the left-eye synthesized image and the right-eye synthesized image applied to display the 3D images are generated.

Finally, the process proceeds to step S111. The images synthesized in steps S109 and S110 are generated in accordance with an appropriate record format (for example, CIPA DC-007 Multi-Picture Format) and are stored in the record unit (recording media) 211.

When the above-described steps are performed, two images, that is, the left-eye image and the right-eye image applied to display the 3D images can be synthesized.

However, the synthesized image which may not be appropriately displayed as the 3D image may be generated depending on the offset amount set when the synthesized images are generated.

This synthesized image is caused when the overlapping area between the strip areas described with reference to FIG. 10.

Hereinafter, an offset setting process of preventing the generation of the synthesized image inapplicable to display the 3D images will be described.

5. Control to Prevent Occurrence of Overlapping Area of Strips

When the overlapping area occurs between the strip areas, as described with reference to FIG. 10, the left-eye image and the right-eye image that are unusable as the 3D image may be generated.

The overlapping areas of the strips are generated mainly by the following two causes:

(1) when the movement speed of a camera is fast; and
(2) when the inter-strip offset, which is a distance between the left-eye image strip and the right-eye image strip, is small.

The overlapping area of the strip is generated due to the two causes.

First, the occurrence of the overlapping area of the left-eye image strip and the right-eye image strip when the movement speed of a camera is fast will be described with reference to FIGS. 13A and 13B.

Figure 13A:
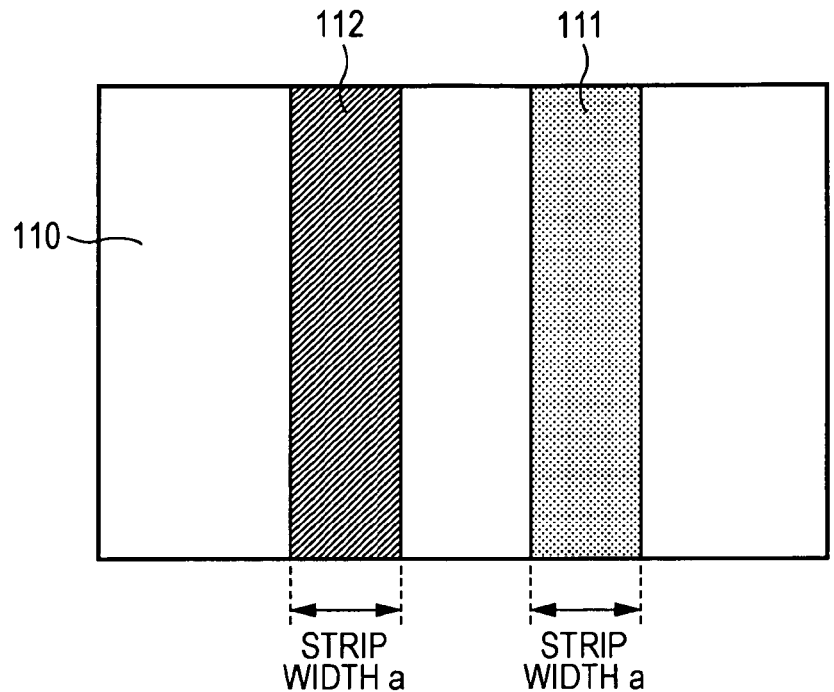
FIGS. 13A and 13B are explanatory diagrams illustrating an occurrence of an overlapping area between a left-eye image strip and a right-eye image strip when the movement speed of a camera is fast.
Figure 13B:
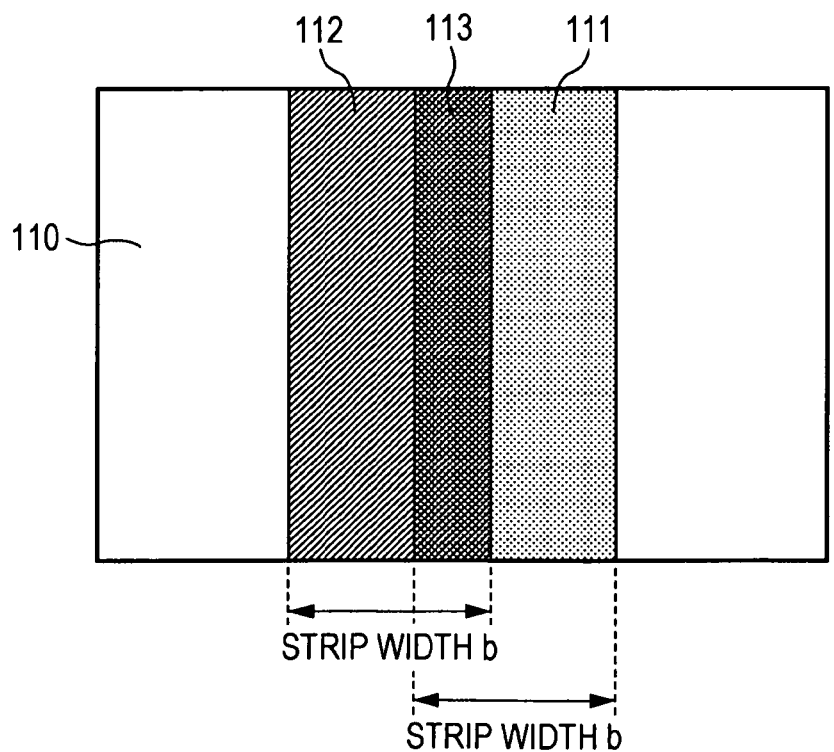

In FIGS. 13A and 13B, examples of photographed images at the following movement speeds of two cameras are shown:

(A) when swing speed (movement speed) of the camera is slow; and
(B) when swing speed (movement speed) of the camera is fast.

When (A) the swing speed (movement speed) of the camera is slow, as shown in FIG. 13A, the left-eye image strip 111 and the right-eye image strip 112 set in the image 110 are distant from each other, thereby causing no overlapping area.

However, when (B) the swing speed (movement speed) of the camera is fast, as shown in FIG. 13B, the left-eye image strip 111 and the right-eye image strip 112 set in the image 110 are not distant from each other, thereby causing the overlapping area 113.

Next, the occurrence of the overlapping area when the offset between the left-eye image strip and the right-eye image strip is small will be described with reference to FIGS. 14A and 14B.

When the movement amount between the continuously photographed images is constant (the swing speed of the camera is constant) but the distance (inter-strip offset) between the strip areas used for the left-eye image and the strip area used for the right-eye image is large, the strips do not overlap with each other. However, when the inter-strip offset is small, the strips overlap with each other.

Figure 14A:
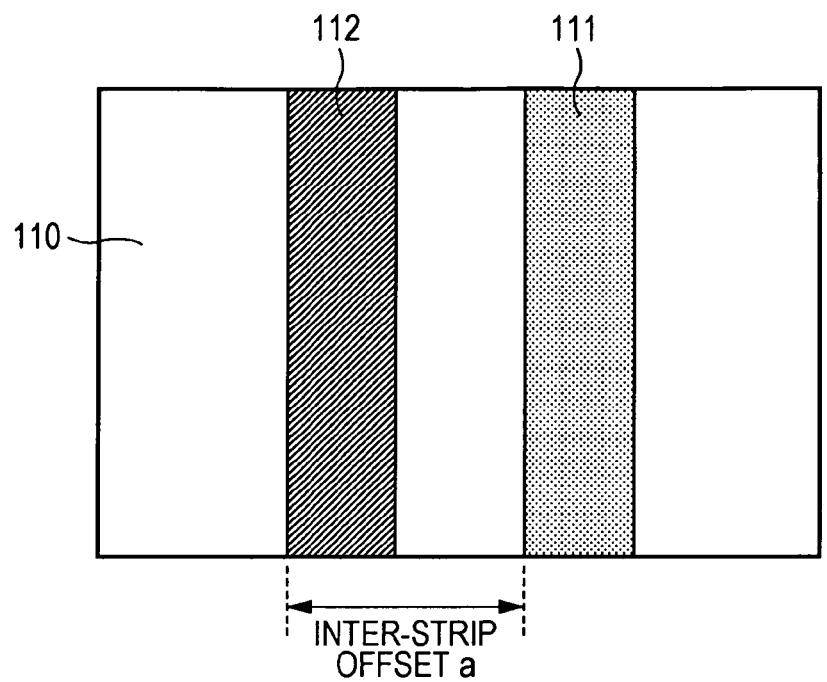
FIGS. 14A and 14B are explanatory diagrams illustrating an occurrence of the overlapping area between a left-eye image strip and a right-eye image strip when offset between the left-eye image strip and the right-eye image strip is small.
Figure 14B:
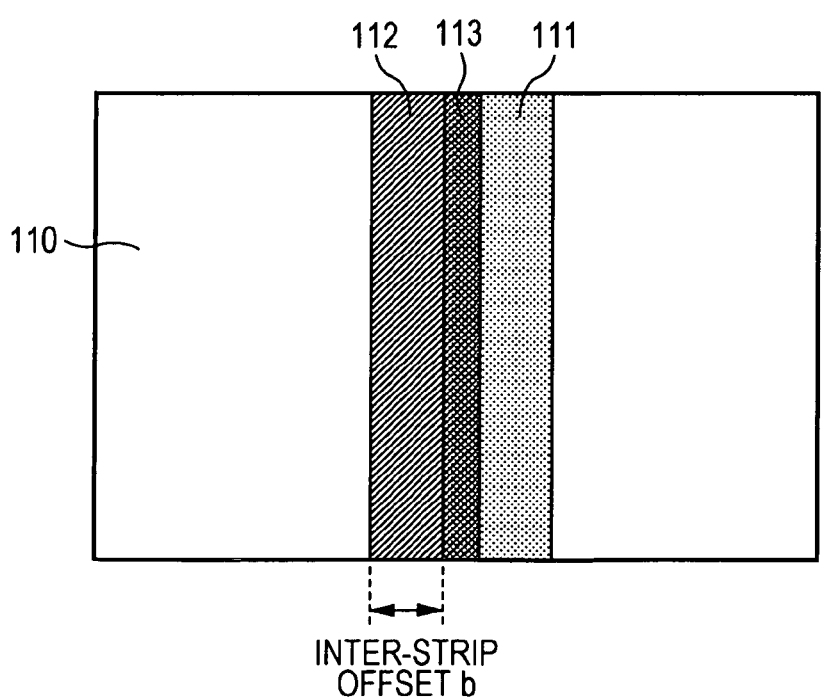

In FIGS. 14A and 14B, examples of the photographed images of the offset setting between the following two strips:

(A) when the inter-strip offset is large; and
(B) when the inter-strip offset is small.

When (A) the inter-strip offset is large, as shown in FIG. 14A, the left-eye image strip 111 and the right-eye image strip 112 set in the image 110 are distant from each other, thereby causing no overlapping area.

However, when (B) the inter-strip offset is small, as shown in FIG. 14B, the left-eye image strip 111 and the right-eye image strip 112 set in the image 110 are not distant from each other, thereby causing the overlapping area 113.

The overlapping areas of the strips are generated mainly by the following two causes:

(1) when the movement speed of the camera is fast; and
(2) when the inter-strip offset, which is a distance between the left-eye image strip and the right-eye image strip, is small.

Accordingly, by eliminating the two causes, it is possible to prevent the occurrence of the overlapping area of the strips.

That is, in order to prevent the occurrence of the overlapping area of the strips, it is necessary to allow the inter-strip offset, which is the distance between the left-eye image strip and the right-eye image strip set in each image to be not small in consideration of the movement speed of the camera.

6. Upper limit of Strip Offset

In order to prevent the occurrence of the overlapping area of the strips, as described above width reference to FIGS. 13A, 13B, 14A, and 14B, it is necessary to allow the inter-strip offset, which is the distance between the left-eye image strip and the right-eye image strip set in each image to be not small in consideration of the movement speed of the camera. However, when this fact is taken into consideration, the distance between the left-eye image strip and the right-eye image strip, that is, the inter-strip offset may become excessive, thereby causing a new problem with the excess of the inter-strip offset.

Figure 15A:
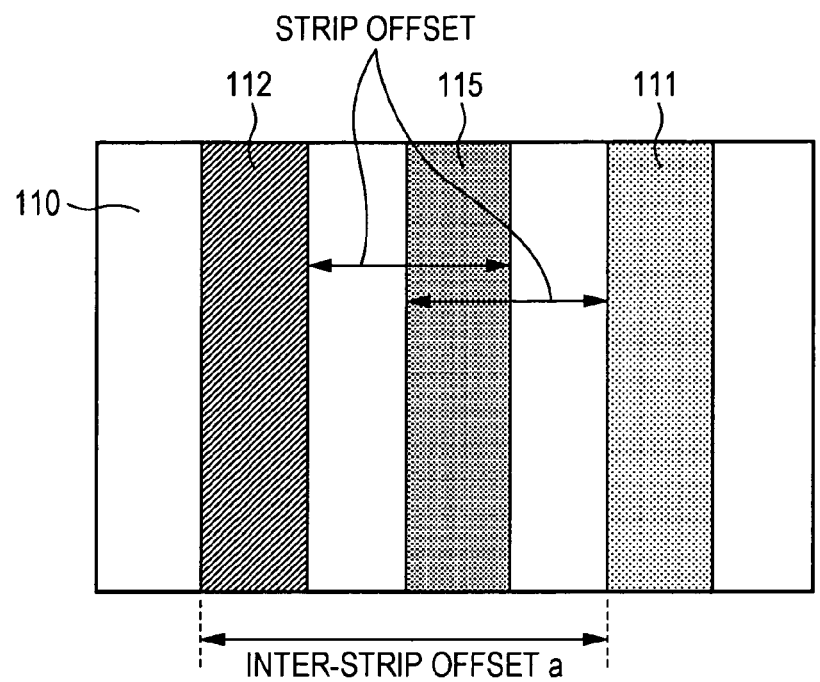
FIGS. 15A and 15B are explanatory diagrams illustrating an example in which the synthesis image is not generated due to an excessive offset between the left-eye image strip and the right-eye image strip.

Even in a case where the movement amounts of the continuously photographed images are the same (that is, the strip widths w are the same), the strip areas desired to be used are set in the photographed image 110 when the inter-strip offset is small (FIG. 15A). On the other hand, when the inter-strip offset is large, the strip areas desired to be used exceeds the photographed image 110 or the storage image area of the memory (for the image synthesis process) 205. Therefore, since the data is not sufficient (see FIG. 15B), the synthesized image may not be generated.

Even in the case where the inter-strip offsets are the same, the strip width becomes large when the movement amount between the continuously photographed images. Therefore, the strip may exceed the image capturing surface or the memory storage area in some cases.

As described above with reference to FIG. 6, the distance between the 2D panorama image strip 115 and the left-eye image strip 111 and the distance between the 2D panorama image strip 115 and the right-eye image strip 112 are defined as the "offset" or the "strip offset".

The distance between the left-eye image strip 111 and the right-eye image strip 112 is defined as the "inter-strip offset".

Moreover, an expression of inter-strip offset=(strip offset)×2 is satisfied.

A case where the synthesized images may not be generated due to the excessive offset between the left-eye image strip and the right-eye image strip will be described with reference to FIGS. 15A and 15B.

Figure 15B:
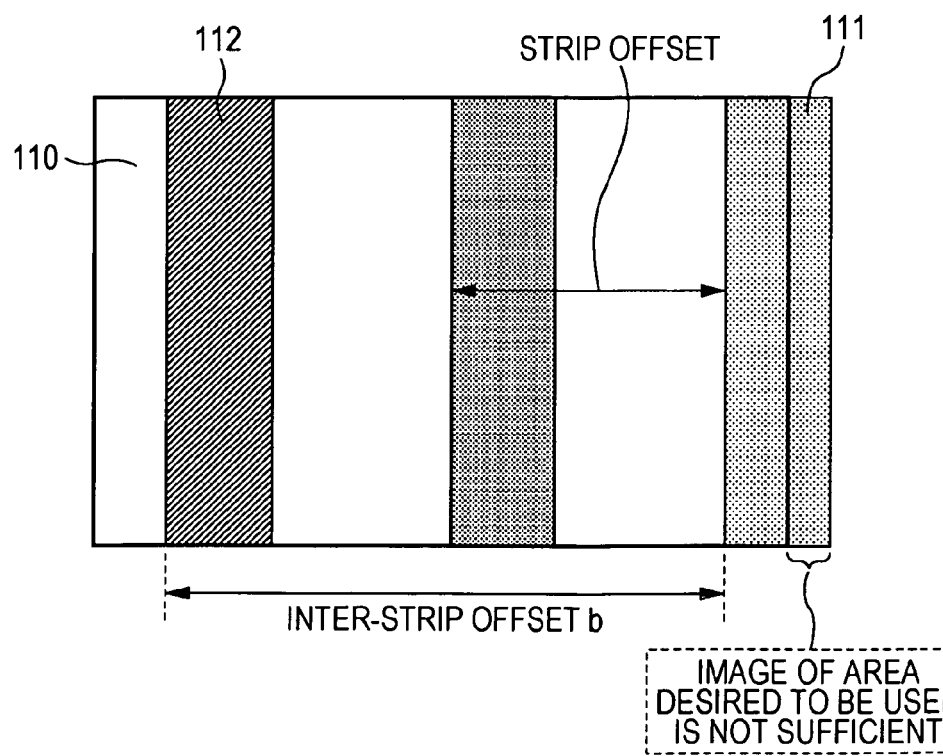

In FIGS. 15A and 15B, the offset between the following two left-eye and right-eye strips are shown:

(A) when the left-eye and right-eye strips are present in the photographed image 110; and
(B) when the left-eye and right-eye strips exceed the photographed image 110.

When the left-eye and right-eye strips are present in the photographed image 110, as shown in FIG. 15A, both the left-eye image strip 111 and the right-eye image strip 112 are present in the photographed image 110, and the image data are stored in the memory (for the image synthesis process) 205 of the image capturing apparatus 200 shown in FIG. 11. The image synthesis unit 210 can acquire the strips from the memory (for the image synthesis process) 205 and generate the synthesized images.

That is, the image synthesis unit 210 can extract the left-eye image strip 111 from the memory 205, synthesize the left-eye image strip 111, and generate the left-eye synthesized image (panorama image). In addition, the image synthesis unit 210 can extract the right-eye image strip 112 from the memory 205, synthesize the right-eye image strip 112, and generate the right-eye synthesized image (panorama image).

However, (B) when the left-eye and right-eye strips exceed the photographed image 110, as shown in FIG. 15B, the synthesized images may not be generated.

In the example shown in FIG. 15B, since the right-eye image strip 112 is present in the image 110, the image synthesis unit 210 can acquire the right-eye image strip 112 from the memory (for the image synthesis process) 205.

However, a part of the left-eye image strip 111 is not present in the image 110, but is present beyond the image 110. Data regarding the part of the left-eye image strip 111 outside the image 110 is not data stored in the memory (for the image synthesis process) 205. That is, the image data regarding the image area larger than the image 110 is not stored in the memory (for the image synthesis process) 205, although the maximum size of data is stored. Accordingly, the image synthesis unit 210 can acquire only a part of the data regarding the left-eye image strip 111 from the memory (for the image synthesis process) 205, but may not acquire the entire data. As a consequence, the left-eye synthesized image may not be generated.

As described above, it is necessary to store a plurality of image data photographed in the panorama photographing mode in the memory (for the image synthesis process) 205. Therefore, the middle sections of the images obtained by cutting the ends of the images are set to be stored in advance in some cases.

Figure 16:
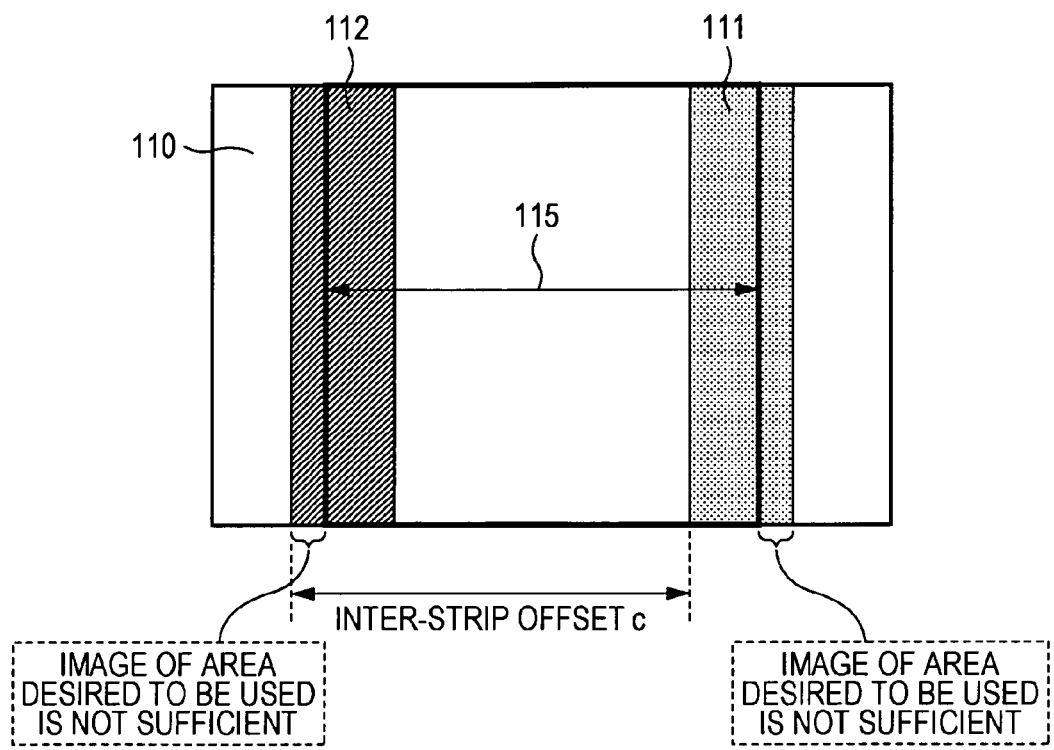
FIG. 16 is an explanatory diagram illustrating an example in which the synthesis image is not generated due to an excessive offset between the left-eye image strip and the right-eye image strip.

For example, as shown in FIG. 16, the image area recorded in the memory (for the image synthesis process) 205 is set to be the same as the memory storage data area 115. Only the image of which the right and left ends are cut is set to be stored in the memory (for the image synthesis process) 205.

In this setting case, even when the left-eye image strip 111 and the right-eye image strip 112 are set to be present in the image 110, the left-eye image strip 111 and the right-eye image strip 112 may exceed the memory storage data area 115. In this case, the image synthesis unit 210 may not acquire the entire data regarding the strip image from the memory (for the image synthesis process) 205, the synthesized images may not be generated.

Accordingly, when the inter-strip offset which is the distance between the left-eye image strip and the right-eye image strip is excessive and thus the strip exceeds the outside of the image area stored in the memory (for the image synthesis process) 205, the synthesized images may not be generated.

7. Process of Controlling Strip Offset

A configuration will be described in which the left-eye synthesized image and the right-eye synthesized image applied to display the 3D images are generated by controlling the strip offset in consideration of the above-mentioned problems.

As described above, the overlap of the area between the strip area used for the right-eye image and the strip area for the left-eye image or the lack of the data is largely dependent on the movement amount between the continuously photographed images. An example of calculating a target value for determining the strip offset to avoid the causes will be described below.

As described above, the relationship between the strip offset and the inter-strip offset satisfies the above relation of strip offset=(inter-strip offset)/2.

The strip offset and the inter-strip offset are defined by the number (pixel number) of the image or pixels of the image capturing element.

Figure 17:
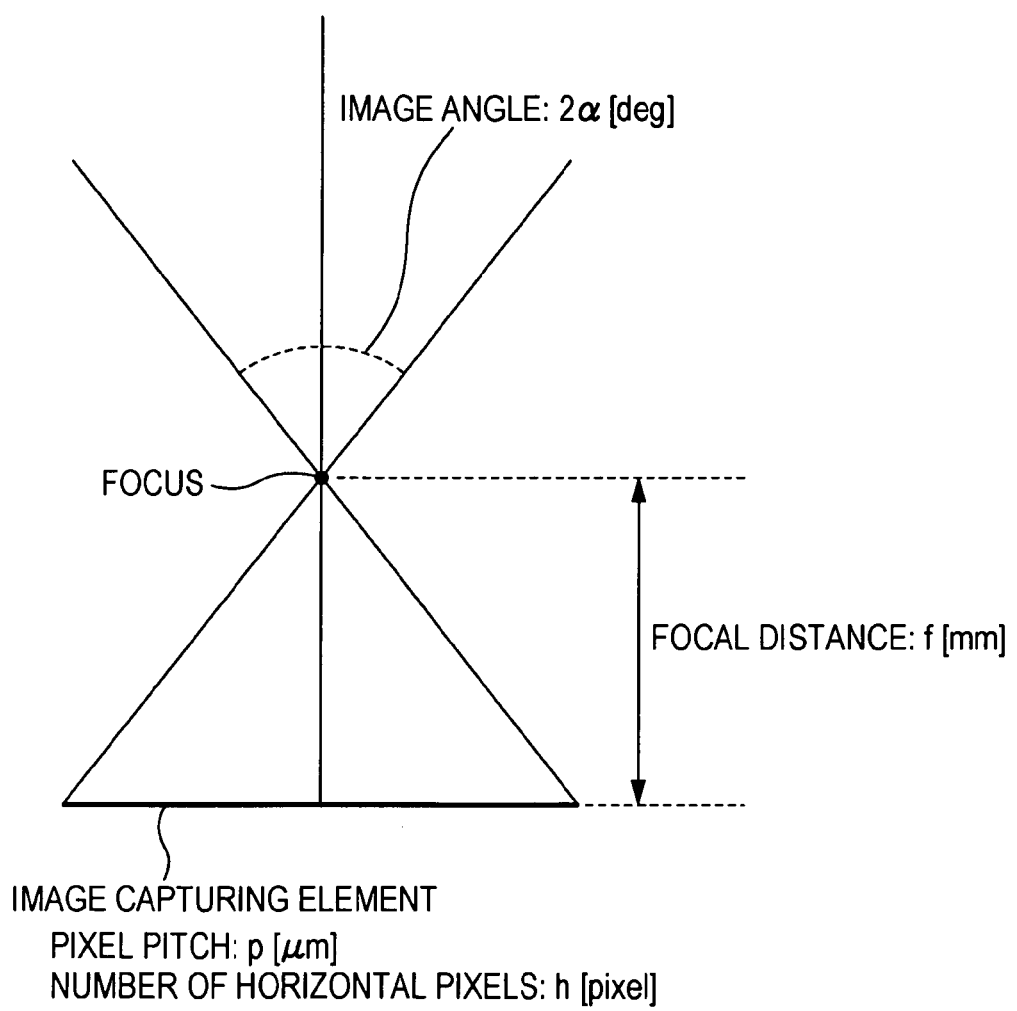
FIG. 17 is an explanatory diagram illustrating a specific exemplary configuration of an image capturing apparatus (camera) photographing an image.

The configuration of the image capturing apparatus (camera) capturing an image shown in FIG. 17 is as follows:

a focal distance is f [mm];

a Pixel pitch of image capturing element is p [μm]; and the number of horizontal pixels of image capturing element is h [pixel].

The image is photograph by the camera with the above setting.

A view angle α [deg] of one image photograph by the camera is calculated by the following expression (Expression 1).

[Expression 1]

$$\alpha[deg] = \frac{180}{\pi} \times 2 \times \tan^{-1} \frac{h \times p \times 10^{-3}}{2 \times f} \quad \text{(Expression 1)}$$

When the view angle α [deg] calculated by Expression 1 is used, a view angle (hereinafter, also referred to as a pixel density) μ [deg/pixel] in the vicinity of one pixel of the image capturing element can be defined by the following expression (Expression 2)

[Expression 2]

$$\mu[deg/\text{pixel}] = \frac{\alpha}{h} \quad \text{(Expression 2)}$$

Next, it is assumed that a continuous shooting speed, that is, the number of photographed image frames for about 1 second in the photographing mode (the 3D panorama mode in which the left-eye image and the right-eye image are generated) in which the images are photographed while the camera is moved is s [fps], one (maximum) strip width w [pixel] set at the swing angular velocity d [deg/sec] of the camera can be defined by the following expression (Expression 3). In addition, the strip width w of the left-eye image strip and the right-eye image strip set in one image is common.

[Expression 3]

$$w[\text{pixel}] = \frac{d}{s} \times \frac{1}{\mu} \quad \text{(Expression 3)}$$

By this expression (Expression 3), the strip width w at the swing angular velocity d [deg/sec] of the camera is determined.

The strip offset allowable for the swing angular velocity, that is, the allowable minimum strip offset amount at which no overlapping area occurs between the left-eye image strip and the right-eye image strip, that is, the minimum strip offset amount min_ofst [pixel] can be expressed by the following expression (Expression 4).

[Expression 4]

$$\text{min\_ofst [pixel]} = \frac{w}{2} \quad \text{(Expression 4)}$$

However, the definition of the strip offset amount is made on the assumption that the left-eye image strip and the right-eye image strip are offset to be bilaterally symmetric with reference to the center of the image with reference to FIG. 15A. In addition, as described above with reference to FIG. 15A, the strip offset corresponds to the distance of ½ of the inter-strip offset which is the distance between the left-eye image strip and the right-eye image strip.

That is, the relation of strip offset=(inter-strip offset)/2 is satisfied.

On the other hand, the allowable maximum strip offset amount, that is, the maximum strip offset amount max_ofst [pixel] set so that the strip areas used to generate the synthesized images described with reference to FIGS. 15A, 15B, and 16 do not exceed the image area stored in the image memory (the image synthesis process) 205 can be expressed by the following expression (Expression 5).

[Expression 5]

$$\text{max\_ofst [pixel]} = \frac{t - \text{min\_ofst}}{2} \quad \text{(Expression 5)}$$

In this expression (Expression 5), t is a horizontal effective size t [pixel] of one image photographed by the camera. The horizontal effective size t [pixel] corresponds to the number of horizontal pixels which is the horizontal width of the image stored in the image memory (for the image synthesis process) 205 shown in FIG. 11.

For example, the configuration of the camera used to photograph the images is as follows:
the focal distance f is equal to 4.5 [mm];
the pixel pitch p of the image capturing element is equal to 5 [μm]; and
the number h of horizontal pixels of the image capturing element is 1000 [pixel].

The camera with the setting is assumed to photograph the images.

The view angle α [deg] of one image photographed by the camera can be calculated as follows by the above-described expression (Expression 1):

view angle α [deg]=58.1 [deg].

The pixel density μ [deg/pixel] which is the view angle in the vicinity of one pixel of the image capturing element can be calculated as follows by the above-described expression (Expression 2):

pixel density μ [deg/pixel]=0.0581 [deg/pixel].

Figure 18:
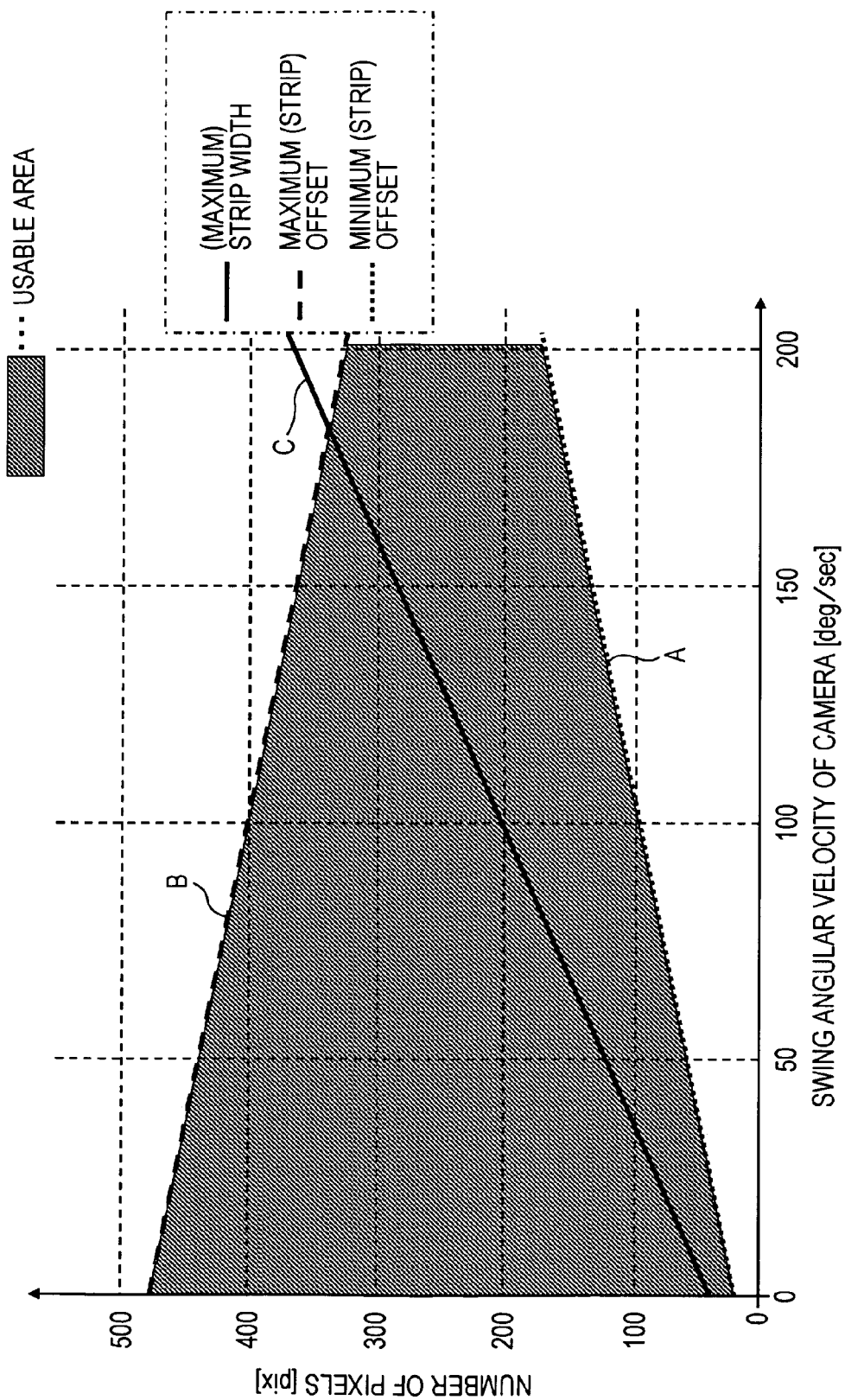
FIG. 18 is a diagram illustrating an allowable offset amount which is a target range of parameters for avoiding the occurrence of an overlap in accordance with a movement amount (swing angular velocity of a camera) between continuously photographed images and data shortage.

In these settings, when the overlapping area corresponding to the movement amount (the swing angular velocity of the camera) between the continuously photographed images or a target range of the parameter for avoiding the data shortage is illustrated on the assumption that the horizontal effect size t per continuously photographed image is 1000 [pixel], a range indicated by a diagonal line area shown in FIG. 18 is obtained.

In the graph shown in FIG. 18, the horizontal axis represents the swing angular velocity d [deg/sec] of the camera and the vertical axis represents the number of pixels of an image.

The number of pixels on the vertical axis is the number of pixels in a swing direction of the camera. For example, when the camera is moved in a horizontal direction, the number of pixels is the number of pixels in the horizontal direction of the image.

The number of pixels on the vertical axis corresponds to the number of pixels in the offset direction of the strip width and, in this case, in the horizontal direction.

Line A shown in FIG. 18 is a line drawn by the above-described definition expression (Expression 4).

That is, the line A is a straight line drawn by the definition expression of the allowable minimum strip offset amount at which the overlap between the left-eye image strip and the right-eye image strip does not occur (the left-eye image strip and the right-eye image strip do not overlap with each other).

That is, the line A is the straight line indicated by the above expression of the minimum strip offset amount min_ofst [pixel]=w/2.

Line B shown in FIG. 18 is a line drawn by the above-described definition expression (Expression 5).

That is, the line B is a straight line drawn by the definition expression of the allowable maximum strip offset amount at which the strip areas used to generate the synthesized images do not exceed the image area stored in the image memory (the image synthesis process) 205.

That is, the line B is the straight line indicated by the above expression of the maximum strip offset amount max_ofst [pixel]=(t−min_ofst [pixel])/2.

Line C is a line drawn as a reference and is a straight line indicating one (maximum) strip width w [pixel] set in an image in accordance with the swing angular velocity d [deg/sec] of the camera defined by the above-described expression (Expression 3). This straight line is a straight line calculated in accordance with a value calculated in advance based on information on the configuration of the camera.

Numerical values of the graph are values when a margin set in the connection section in the image synthesis process is considered to be 16 [pixel].

By setting the strip offset amount (=(inter-strip offset amount)/2) between the left-eye image strip and the right-eye image strip set in the photographed image in the diagonal line area between the straight lines A and B shown in FIG. 18, it is possible to satisfy a condition (condition 1) that the overlap between the left-eye image strip and the right-eye image strip does not occur and a condition (condition 2) that the left-eye image strip and the right-eye image strip are not present beyond the image area stored in the image memory (for the image synthesis process) 205.

That is, by setting the strip offset amount (=(inter-strip offset amount)/2) between the left-eye image strip and the right-eye image strip set in the photographed image in the diagonal line area between the straight lines A and B shown in FIG. 18, the strip areas where the left-eye synthesized image and the right-eye synthesized image applied to display the 3D images are reliably generated can be acquired from the photographed images. Therefore, the process of generating the 3-dimensional image with no broken portion can be performed.

The diagonal line area shown in FIG. 18, that is, the strip offset amount of the range between the straight lines defined by Expressions 4 and 5 described above is calculated using the parameters stored in the memory 209 by the image synthesis unit 210 shown in FIG. 11. Alternatively, the allowable offset calculated in advance is acquired from the memory 209.

This process corresponds to the process of step S108 of the flowchart shown in FIG. 12.

In steps S109 and S110 of the flowchart shown in FIG. 12, the offset is set in the range of the allowable offset acquired or calculated in step S108 and the positions of the left-eye strip and the right-eye strip are determined.

In this process, the strip areas where the left-eye synthesized image and the right-eye synthesized image applied to display the 3D images are reliably generated can be acquired from the photographed images. Therefore, the process of generating the 3-dimensional image with no broken portion can be performed.

The image synthesis unit 210 determines the strip widths of the left-eye strip and the right-eye strip by applying the movement amounts corresponding to the images acquired from the movement amount memory 208.

The image capturing apparatus (camera) includes the movement amount detection unit 207 calculating the movement amount between the images, but there is generally a limit on the movement amount detectable by the movement amount detection unit 207. That is, the movement amount exceeding the measurement limit may not be detected. For example, it is assumed that the detection limit of the movement amount is 110 [deg/sec].

In this case, the right area of the diagonal line area shown in FIG. 18 becomes an actually unusable area. When the detection limit of the movement amount of the camera is 110 [deg/sec], an allowable range of the offset setting becomes a diagonal line area shown in FIG. 19.

Figure 19:
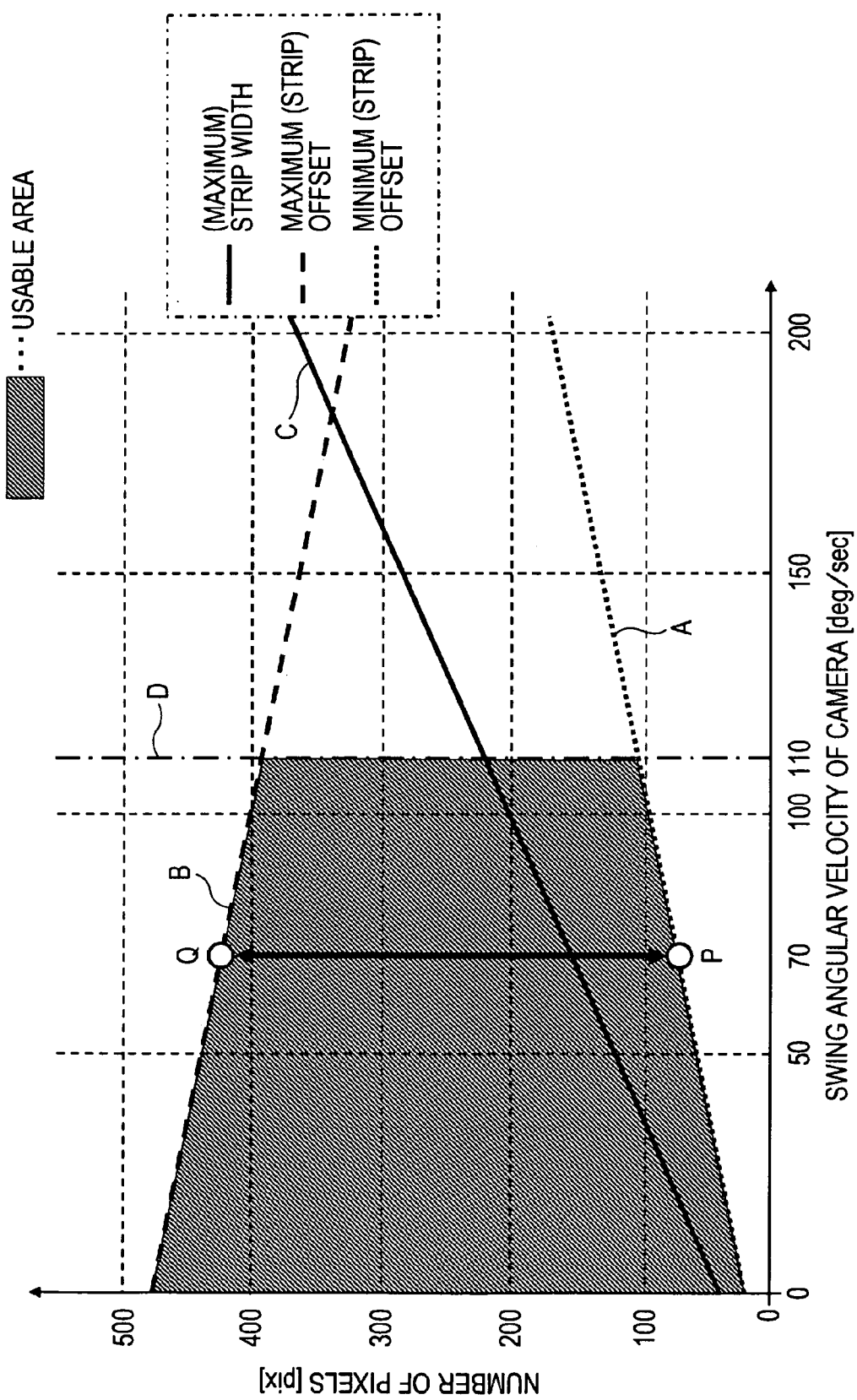
FIG. 19 is a diagram illustrating the allowable offset amount which is the target range of the parameters for avoiding the occurrence of an overlap in accordance with the movement amount (swing angular velocity of a camera) between continuously photographed images and data shortage.

A central vertical line shown in FIG. 19 is a line indicating that the detection limit of the movement amount is 110 [deg/sec]. The left area of the central vertical line is an area where the movement amount may not be detected since the movement amount of the camera is very large. Therefore, the strip offset is set on the left side in which the detection limit of the movement amount is 110 [deg/sec] or less and in the range between the above-described straight lines A and B.

By setting the strip offset amount in this way, it is possible to satisfy the condition (condition 1) that the overlap between the left-eye image strip and the right-eye image strip does not occur and the condition (condition 2) that the left-eye image strip and the right-eye image strip are not present beyond the image area stored in the image memory (for the image synthesis process) 205.

As a consequence, the strip areas where the left-eye synthesized image and the right-eye synthesized image applied to display the 3D images are reliably generated can be acquired from the photographed images. Therefore, the process of generating the 3-dimensional image with no broken portion can be performed.

For example, in the setting shown in FIG. 19, when the swing angular velocity of the camera is 70 [deg/sec], the number of pixels between P and Q shown in FIG. 19 is the allowable range of the strip offset amount. In a case of P=minimum offset amount=77 [pixel] and Q=maximum offset amount=425 [pixel], the allowable range of the strip offset amount is the range from 77 pixels to 425 pixels.

In step S108 of the flowchart shown in FIG. 12, the allowable offset is acquired or calculated. In steps S109 and S110, the strip offset amount is set in the allowable range, the left-eye image strip area and the right-eye image strip area are set in each image, and then the left-eye synthesized image and the right-eye synthesized image are generated by performing the process of connection the set strip areas.

8. Specific Example of Configuration and Process of Image Synthesis Unit

As described with reference to FIGS. 18 and 19, the image processing apparatus according to the embodiment of the invention acquires or calculates the allowable offset which is the allowable strip offset range and sets the left-eye image strip and the right-eye image strip, in which the offset as the allowable offset range is set, in each photographed image. Thereafter, by performing the image synthesis process of connecting the strips, the left-eye synthesized image and the right-eye synthesized image applicable to display the 3D images are generated.

The configuration and the process of the image synthesis unit 210 performing the image synthesis process will be described with reference to FIG. 20.

Figure 20:
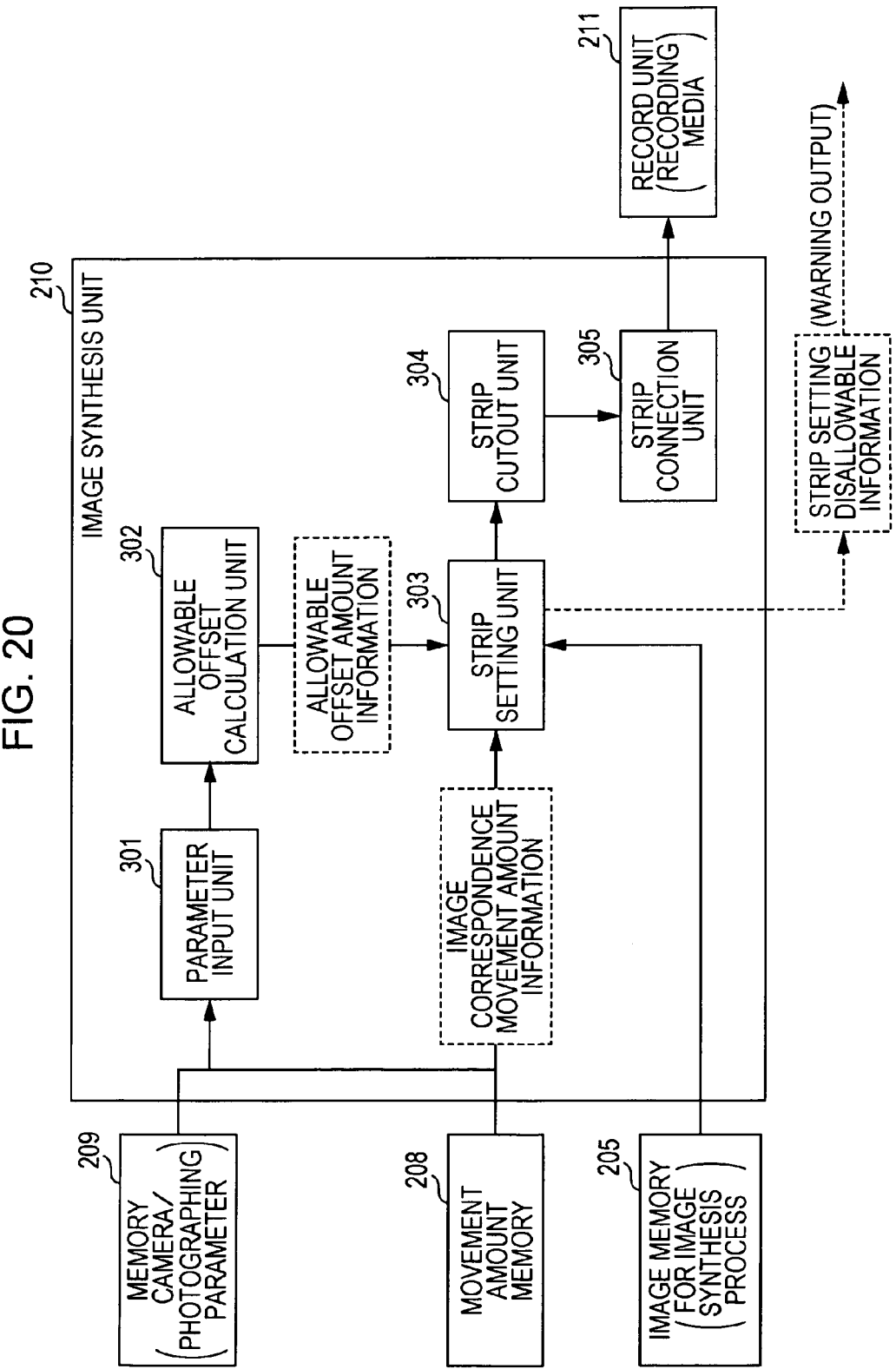
FIG. 20 is an explanatory diagram illustrating the configuration and the process of an image synthesis unit.

As shown in FIG. 20, the image synthesis unit 210 includes a parameter input unit 301, an allowable offset calculation unit 302, the strip setting unit 303, a strip cutout unit 304, and a strip connection unit 305.

The parameter input unit 301 inputs the parameters necessary for calculating the allowable offset in the allowable offset calculation unit 302 from the memory 209 and supplies the parameters to the allowable offset calculation unit 302.

That is, the parameter input unit 301 inputs the parameters necessary for calculating the allowable minimum offset amount and the allowable maximum offset amount described above by applying Expressions 1 to 5 described above from the memory 209. Specifically, the parameters are information such as the focal distance [f(mm)], the pixel pitch [p(μm)] of the image capturing element, the number of horizontal pixels [h(pixel)], the continuous shooting speed [s(fps)], and the swing angular velocity [d(deg/sec)] of the camera.

The allowable offset calculation unit 302 calculates the minimum strip offset amount and the maximum strip offset amount by applying Expressions 1 to 5 described above, using the parameters input from the memory 209 by the parameter input unit 201.

That is, the values of the minimum strip offset amount min_ofst [pixel]=w/2 and the maximum strip offset amount max_ofst [pixel]=(t−min_ofst [pixel]/2 are calculated.

The calculated values are the values of the minimum strip offset amount and the maximum strip offset amount calculated using predetermined parameters and are, for example, the values of P and Q shown in FIG. 19.

That is, the values of P=minimum offset amount=77 [pixel] and Q=maximum offset amount=425 [pixel] are output.

The allowable offset calculation unit 302 supplies the minimum offset amount and the maximum offset amount as the allowable offset amounts to the strip setting unit 303.

The strip setting unit 303 acquires images to set the strips from the image memory (for the image synthesis process) 205 and acquires the movement amount information corresponding to the images from the movement amount memory 208. The strip setting unit 303 determines the strip width in accordance with the movement amount and sets the strip offset of the left-eye image strip and the right-eye image strip so as to be within the allowable offset range calculated by the allowable offset calculation unit 302.

As described above, the relation of strip width offset=(inter-strip offset)/2 is satisfied.

However, in some cases, the strip may not be set within the allowable offset range calculated by the allowable offset calculation unit 302 depending on, for example, the value of the movement amount. In this case, the strip setting unit 303 outputs data indicating that the strip may not be set, for example, to the control unit. The control unit outputs a warning in response to the output of the data. For example, the control unit displays a warning message on the display unit of the camera or performs a process of outputting an alarm. For example, a user can retry the photographing in response to the warning.

The strip setting unit 303 sets the left-eye image strip area and the right-eye image strip area when the strip can be set within the allowable offset range calculated by the allowable offset calculation unit 302. Next, the strip cutout unit 304 cuts the strip areas set by the strip setting unit 303. The strip connection unit 305 generates the synthesized image by connecting the strips cut by the strip cutout unit 304.

The strip output process and the strip connection process are performed individually for the left-eye synthesized image and the right-eye synthesized image.

That is, the process of connecting only the left-eye image strips when the left-eye synthesized image is generated. The process of connecting only the right-eye image strips when the right-eye synthesized image is generated.

By performing these processes, it is possible to generate the 3D left-eye panorama image and the 3D right-eye panorama image shown in Parts (2a) and (2b) of FIG. 7.

The calculated values of the above-described allowable offset may be stored in advance in the memory 209 and the image synthesis unit 210 may acquire and use the allowable offset from the memory. That is, the process of calculating the allowable offset using the various parameters may be omitted.

The configuration and an exemplary process of the image synthesis unit 210 will be described with reference to FIG. 21.

Figure 21:
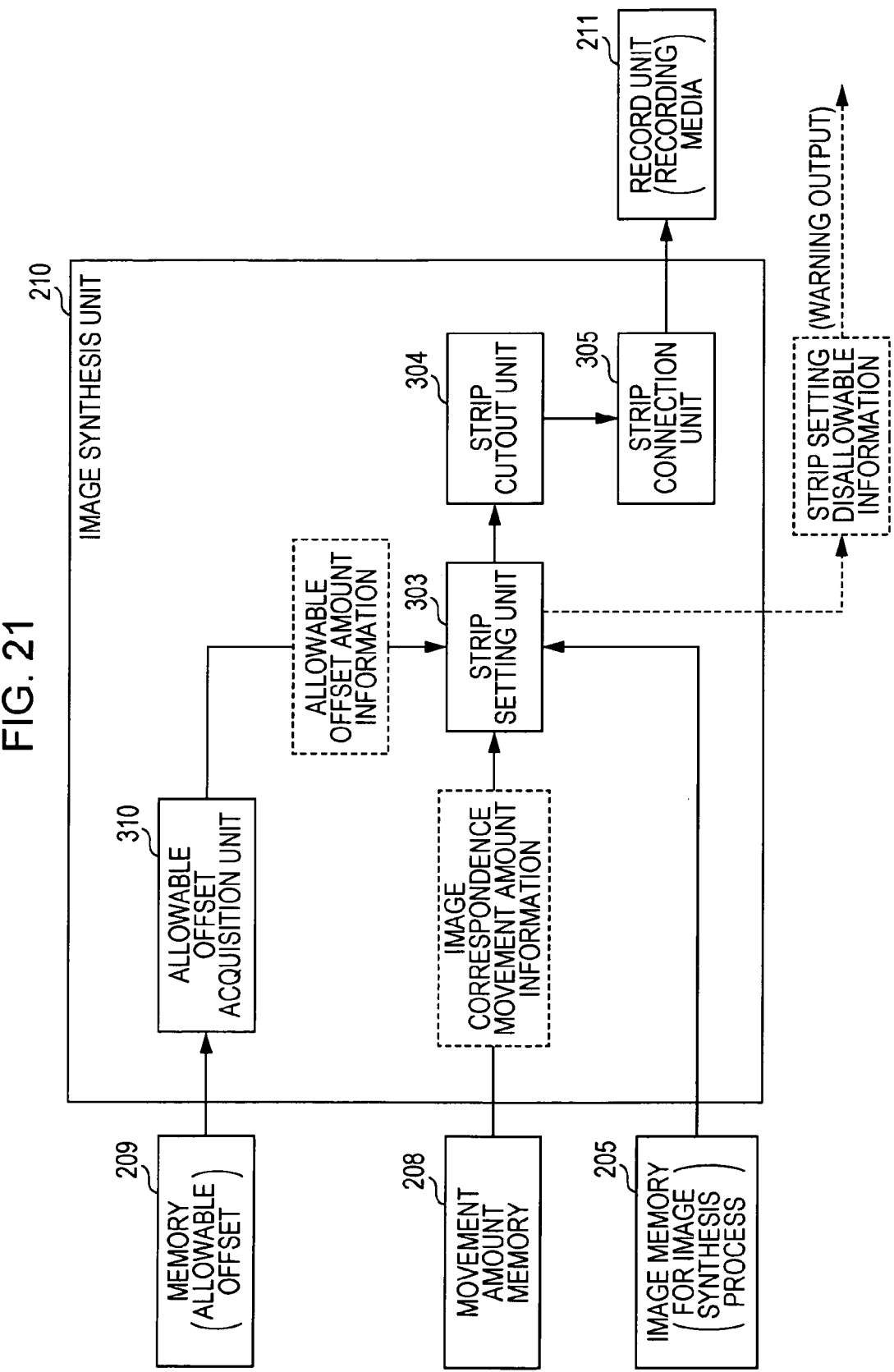
FIG. 21 is an explanatory diagram illustrating the configuration and the process of an image synthesis unit.

The image synthesis unit 210 shown in FIG. 21 includes an allowable offset acquisition unit 310, the strip setting unit 303, the strip cutout unit 304, and the strip connection unit 305.

The allowable offset acquisition unit 310 acquires allowable offset information calculated in advance, that is, the allowable offset information of the ranges of the minimum strip offset amount min_ofst [pixel]=w/2 and the maximum strip offset amount max_ofst [pixel]=(t−min_ofst [pixel])/2 of the diagonal line area shown in FIG. 19, for example, from the memory 209.

The allowable offset acquisition unit 310 supplies the allowable offset information acquired from the memory to the strip setting unit 303.

The strip setting unit 303 acquires the images to set the strips from the image memory (for the image synthesis process) 205 and acquires the movement amount information corresponding to the images from the movement amount memory 208. The strip setting unit 303 determines the strip width in accordance with the movement amount and sets the strip offset of the left-eye image strip and the right-eye image strip so as to be within the allowable offset range supplied from the allowable offset acquisition unit 310.

However, in some cases, the strip may not be set within the allowable offset range acquired by the allowable offset acquisition unit 310 depending on, for example, the value of the movement amount. In this case, the strip setting unit 303 outputs data indicating that the strip may not be set, for example, to the control unit. The control unit outputs a warning in response to the outputting of the data. For example, the control unit displays a warning message on the display unit of the camera or performs a process of outputting an alarm. For example, a user can retry the photographing in response to the warning.

The strip setting unit 303 sets the left-eye image strip area and the right-eye image strip area when the strip can be set within the allowable offset range supplied from the allowable offset acquisition unit 310. Next, the strip cutout unit 304 cuts the strip areas set by the strip setting unit 303. The strip connection unit 305 generates the synthesized image by connecting the strips cut by the strip cutout unit 304.

The strip output process and the strip connection process are performed individually for the left-eye synthesized image and the right-eye synthesized image.

That is, the process of connecting only the left-eye image strips when the left-eye synthesized image is generated. The process of connecting only the right-eye image strips when the right-eye synthesized image is generated.

By performing these processes, it is possible to generate the 3D left-eye panorama image and the 3D right-eye panorama image shown in Parts (2a) and (2b) of FIG. 7.

The calculated values of the above-described allowable offset may be stored in advance in the memory 209 and the image synthesis unit 210 may acquire and use the allowable offset from the memory. That is, the process of calculating the allowable offset using the various parameters may be omitted.

By performing these processes, it is possible to reliably generate the left-eye synthesized image and the right-eye synthesized image, which are the images from the different observing positions, applicable to display the 3D images.

The details have hitherto been made according to the specific embodiment of the invention. However, it is apparent to those who are skilled in the art that the modification and alternations of the embodiment may occur within the scope of the invention without departing from the gist of the invention.

That is, since the invention is disclosed according to the embodiment, the invention should not be construed as limiting. The claims of the invention are referred to determine the gist of the invention.

The series of processes described in the specification may be executed by hardware, software, or the combined configuration thereof. When the processes are executed by software, a program recording the processing order may be installed and executed in a memory embedded in a dedicated hardware computer or a program may be installed and executed in a general computer capable of various kinds of processes. For example, the program may be recorded in advance in a recording medium. As well as installing the program in a computer from the recording medium, the program may be received via a network such as a LAN (Local Area Network) or the Internet and may be installed in a recording medium such as a built-in hard disk.

The various kinds of processes described in the specification may be executed chronologically or may be executed in parallel or individually depending on the processing capacity of an apparatus executing the processes or as necessary. The system in the specification has a logical collective configuration of a plurality of apparatuses and is not limited to a case where the apparatuses with each configuration are included in the same chassis.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
  a movement amount detection unit to obtain movement amounts;
  an image synthesis unit generating a synthesized image by inputting a plurality of images photographed at different positions and connecting strip areas cut from the images,
  in which the movement amount detection unit (i) performs a matching process involving pixels of the present image and those of the immediately preceding image to determine a number of pixels which have moved between the present image and the immediately preceding image and (ii) utilizes the determined number of pixels to obtain a respective movement amount,
  wherein the image synthesis unit is configured to determine the strip areas based on the movement amounts and allowable set positions which involve:
  (i) generating a left-eye synthesized image applied to display a 3-dimensional image by a process of connecting and synthesizing left-eye image strips set in the images and generating a right-eye synthesized image applied to display a 3-dimensional image by a process of connecting and synthesizing right-eye image strips set in the images, and
  (ii) performing a process of setting the left-eye image strip and the right-eye image strip in an allowable range of set positions of the left-eye image strip and the right-eye image strip used to generate the left-eye synthesized image and the right-eye synthesized image, which are at different observing points, applicable to display the 3-dimensional images by acquiring the allowable range from a memory or calculating the allowable range.

2. The image processing apparatus according to claim 1, wherein the image synthesis unit performs a process of acquiring, as the allowable range, an allowable minimum value and an allowable maximum value of a strip offset which is a gap distance between a 2-dimensional synthesized image strip which is an image cutout area applied to generate a 2-dimensional synthesized image and the left-eye image strip or the right-eye image strip from the memory or calculating the allowable minimum value and allowable maximum value as the allowable range.

3. The image processing apparatus according to claim 1, wherein the image synthesis unit performs a process of acquiring a strip set position, at which an overlapping area between setting areas of the left-eye image strip and the right-eye image strip does not occur, as the allowable range from the memory or calculating the strip set position as the allowable range.

4. The image processing apparatus according to claim 1, wherein the image synthesis unit performs a process of acquiring a strip set position, at which the setting areas of the left-eye image strip and the right-eye image strip are within a storage range of an image memory, as the allowable range from the memory or calculating the strip set position as the allowable range.

5. The image processing apparatus according to claim 2, wherein the allowable minimum value of the strip offset is a value calculated by applying each of parameters (a) to (c):
(a) a view angle μ per pixel of an image capturing element of an image capturing apparatus capturing the plurality of images;
(b) a movement angular velocity d when the image capturing apparatus capturing the plurality of images captures the image; and
(c) a continuous shooting speed s of the image capturing apparatus capturing the plurality of images, and
wherein the image synthesis unit performs a process of calculating the allowable minimum value of the strip offset by applying the parameters (a) to (c) or acquiring the calculated value from the memory.

6. The image processing apparatus according to claim 5, wherein the view angle μ per pixel of the image capturing element is a value calculated based on a view angle α per each of the plurality of images,
wherein the view angle α is a value calculated by applying each of parameters (d) to (f):
(d) a focal distance f of a lens of the image capturing apparatus capturing the plurality of images;
(e) a pixel pitch p of the image capturing element of the image capturing apparatus capturing the plurality of images; and
(f) the number h of horizontal pixels of the image capturing element of the image capturing apparatus capturing the plurality of images, and
wherein the image synthesis unit performs a process of calculating the allowable minimum value of the strip offset by applying the parameters (a) to (f) or acquiring the calculated value from the memory.

7. The image processing apparatus according to claim 2, wherein the allowable maximum value of the strip offset is a value calculated based on a horizontal effective size t of one image corresponding to the storage range of the image memory and the allowable minimum value of the strip offset, and
wherein the image synthesis unit performs a process of calculating the allowable maximum value of the strip offset by applying the horizontal effective size t and the allowable minimum value of the strip offset or acquiring the calculated value from the memory.

8. An image capturing apparatus comprising:
a lens unit applied to capture an image;
an image capturing element performing photoelectric conversion of the photographed image; and
the image synthesis unit according to claim 1.

9. An image processing method of performing an image synthesis process in an image processing apparatus, comprising the steps of:
obtaining, by a movement amount detection unit, movement amounts;
generating, by an image synthesis unit, a synthesized image by inputting a plurality of images photographed at different positions and connecting strip areas cut from the images,
in which the step of obtaining includes (i) performing a matching process involving pixels of the present image and those of the immediately preceding image to determine a number of pixels which have moved between the present image and the immediately preceding image and (ii) utilizing the determined number of pixels to obtain a respective movement amount,
wherein the step of generating the synthesized image includes determining the strip areas based on the movement amounts and allowable set positions which involve:
setting a left-eye image strip and a right-eye image strip in an allowable range of set positions of the left-eye image strip and the right-eye image strip used to generate a left-eye synthesized image and a right-eye synthesized image, which are at different observing points, applicable to display 3-dimensional images by acquiring the allowable range from a memory or calculating the allowable range;
generating the left-eye synthesized image applied to display the 3-dimensional image by a process of connecting and synthesizing the left-eye image strips set in the images; and
generating the right-eye synthesized image applied to display the 3-dimensional image by a process of connecting and synthesizing the right-eye image strips set in the images.

10. A non-transitory computer readable medium having stored thereon a program causing an image processing apparatus having a movement amount detection unit and an image synthesis unit to execute an image synthesis process comprising the steps of:
causing the movement amount detection unit to obtain movement amounts; and
causing the image synthesis unit to execute a step of generating a synthesized image by inputting a plurality of images photographed at different positions and connecting strip areas cut from the images,
in which the step of causing the movement amount detection unit to obtain movement amounts includes (i) performing a matching process involving pixels of the present image and those of the immediately preceding image to determine a number of pixels which have moved between the present image and the immediately preceding image and (ii) utilizing the determined number of pixels to obtain a respective movement amount,
wherein the step of generating the synthesized image includes determining the strip areas based on the movement amounts and allowable set positions which involve:
setting a left-eye image strip and a right-eye image strip in an allowable range of set positions of the left-eye image strip and the right-eye image strip used to generate a left-eye synthesized image and a right-eye synthesized image, which are at different observing points, applicable to display 3-dimensional images by acquiring the allowable range from a memory or calculating the allowable range;

generating the left-eye synthesized image applied to display the 3-dimensional image by a process of connecting and synthesizing the left-eye image strips set in the images; and generating the right-eye synthesized image applied to display the 3-dimensional image by a process of connecting and synthesizing the right-eye image strips set in the images.

* * * * *